(12) United States Patent
Friesen et al.

(10) Patent No.: US 9,105,910 B2
(45) Date of Patent: Aug. 11, 2015

(54) ELECTROCHEMICAL CELL SYSTEM WITH SHUNT CURRENT INTERRUPT

(75) Inventors: Cody A. Friesen, Fort McDowell, AZ (US); Ramkumar Krishnan, Gilbert, AZ (US); Michael John Mihalka, Gilbert, AZ (US); Joel R. Hayes, Chandler, AZ (US); Grant Friesen, Fountain Hills, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 630 days.

(21) Appl. No.: 13/362,775

(22) Filed: Jan. 31, 2012

(65) Prior Publication Data

US 2012/0202127 A1    Aug. 9, 2012

Related U.S. Application Data

(60) Provisional application No. 61/439,759, filed on Feb. 4, 2011.

(51) Int. Cl.
*H01M 8/18* (2006.01)
*B01F 3/04* (2006.01)
(Continued)

(52) U.S. Cl.
CPC ........... *H01M 8/184* (2013.01); *B01F 3/04751* (2013.01); *H01M 2/38* (2013.01); *H01M 2/40* (2013.01); *H01M 10/4214* (2013.01); *H01M 12/065* (2013.01); *B01F 2003/04872* (2013.01);
(Continued)

(58) Field of Classification Search
CPC ......... H01M 12/06; H01M 2/38; H01M 2/40; B01F 3/04241; B01F 3/04248; B01F 3/04262; B01F 3/04007; B01F 3/04021; B01F 3/04049; B01F 2003/04354; B01F 2003/04361; B01F 2003/04368

USPC .......................... 429/403, 406, 451, 452, 512
See application file for complete search history.

(56) References Cited

U.S. PATENT DOCUMENTS

| 3,811,945 | A | 5/1974 | De Rossi |
| 4,277,317 | A | 7/1981 | Grimes et al. |

(Continued)

FOREIGN PATENT DOCUMENTS

| CN | 201383523 | 1/2010 |
| FR | 1528393 A | 6/1968 |

(Continued)

OTHER PUBLICATIONS

Intl. Search Report/Written Opinion of PCTUS2012/023386 filed Jan. 31, 2012 dated Aug. 6, 2012 (17 pages).

(Continued)

*Primary Examiner* — Ula C. Ruddock
*Assistant Examiner* — Thomas Parsons
(74) *Attorney, Agent, or Firm* — Pillsbury Winthrop Shaw Pittman, LLP

(57) ABSTRACT

An electrochemical cell system is configured to utilize an ionically conductive medium flowing through a plurality of electrochemical cells. One or more disperser chambers are provided to disrupt or minimize electrical current flowing between the electrochemical cells, such as between the cathode of one cell and the anode of a subsequent cell by dispersing the ionically conductive medium. Air is introduced into the disperser chamber to prevent the formation of foamed ionically conductive medium, which may reconnect the dispersed ionically conductive medium, allowing the current to again flow therethrough.

36 Claims, 17 Drawing Sheets

(51) Int. Cl.
*H01M 2/38* (2006.01)
*H01M 2/40* (2006.01)
*H01M 10/42* (2006.01)
*H01M 12/06* (2006.01)

(52) U.S. Cl.
CPC ... *H01M 2200/00* (2013.01); *H01M 2300/0002* (2013.01); *H01M 2300/0005* (2013.01); *H01M 2300/0008* (2013.01); *H01M 2300/0011* (2013.01); *H01M 2300/0014* (2013.01); *Y02E 60/528* (2013.01)

(56) References Cited

U.S. PATENT DOCUMENTS

| | | | |
|---|---|---|---|
| 4,371,433 | A | 2/1983 | Balko et al. |
| 4,894,294 | A | 1/1990 | Ashizawa et al. |
| 5,011,747 | A | 4/1991 | Strong et al. |
| 5,439,758 | A * | 8/1995 | Stone et al. ............ 429/63 |
| 5,615,717 | A | 4/1997 | Cheiky |
| 8,309,259 | B2 * | 11/2012 | Friesen et al. ............ 429/402 |
| 2009/0284229 | A1 | 11/2009 | Friesen et al. |
| 2010/0119895 | A1 | 5/2010 | Friesen |
| 2010/0285375 | A1 | 11/2010 | Friesen et al. |
| 2010/0316935 | A1 | 12/2010 | Friesen et al. |
| 2011/0039181 | A1 | 2/2011 | Friesen et al. |
| 2011/0070506 | A1 | 3/2011 | Friesen et al. |
| 2011/0086278 | A1 | 4/2011 | Friesen et al. |
| 2011/0189551 | A1 | 8/2011 | Friesen et al. |
| 2011/0200893 | A1 | 8/2011 | Friesen et al. |
| 2011/0250512 | A1 | 10/2011 | Friesen et al. |
| 2011/0294021 | A1 * | 12/2011 | Suto ............ 429/403 |
| 2011/0305959 | A1 | 12/2011 | Friesen et al. |
| 2011/0316485 | A1 | 12/2011 | Krishnan et al. |

FOREIGN PATENT DOCUMENTS

| | | |
|---|---|---|
| GB | 1284802 A | 8/1972 |
| GB | 2085475 A | 4/1982 |
| GB | 2161316 A | 1/1986 |

OTHER PUBLICATIONS

Intl. Preliminary Report on Patentability dated Feb. 1, 2013 of PCT/US12/23386 filed Jan. 31, 2012 (8 pages).
Chinese Office Action issued in Chinese Patent Application No. 201210024390.7 on Mar. 11, 2015.

* cited by examiner

ELECTROCHEMICAL CELL SYSTEM WITH SHUNT CURRENT INTERRUPT

This application claims priority to U.S. Provisional Application Ser. No. 61/439,759, filed on Feb. 4, 2011, incorporated herein in its entirety by reference.

FIELD

The present invention is generally related to an electrochemical cell system, and more particularly to an electrochemical cell system utilizing a liquid electrolyte.

BACKGROUND

Many types of electrochemical cells utilize a liquid electrolyte to support electrochemical reactions within the cell. For example, a metal-air electrochemical cell system may comprise a plurality of cells, each having a fuel electrode serving as an anode at which metal fuel is oxidized, and an air breathing cathode at which oxygen from ambient air is reduced. Such a cell may also comprise an electrolyte to communicate the oxidized/reduced ions between the electrodes. For example, see U.S. Patent Publication No. 2009/0284229, incorporated in its entirety herein by reference. In some electrochemical cell systems comprising a plurality of electrochemical cells, the electrolyte may be shared by multiple cells. For example, the electrolyte may flow in series from one cell to another, such as is described in U.S. patent application Ser. No. 12/631,484, incorporated herein in its entirety by reference. In other electrochemical cell systems, the electrolyte may be shared by multiple cells, but may flow partially in parallel.

In some electrochemical cell systems sharing the electrolyte between multiple electrochemical cells, shunt current, a parasitic or counter-productive current that flows through the ionically conductive medium between electrodes of different cells, may arise. In some cases, shunt current may be most pronounced between the first cell and the last cell in a plurality of electrochemical cells connected in series, because they have the greatest potential difference. In cells affected by shunt current, it may be useful to interrupt the flow of the electrolyte so that the shunt current cannot travel through the electrolyte. Some shunt current interrupters that interrupt current flow are known. For example, see U.S. Pat. Nos. 3,811,945, 4,371,433, and 4,894,294.

Among other improvements, the present application also endeavors to provide an effective and improved way of preventing shunt current by interrupting current flow.

SUMMARY

According to an aspect of the present invention, there is provided a dispersing system for an ionically conductive medium. The dispersing system may include a fluid inlet configured to receive the ionically conductive medium therethrough. The system may also include a disperser configured to separate the ionically conductive medium into a plurality of discrete droplets. The disperser also may have a chamber for receiving the plurality of discrete droplets, and collecting the plurality of discrete droplets to recombine into recombined ionically conductive medium. The dispersing system may also have a fluid outlet associated with the lower portion, configured to provide an outlet for the recombined ionically conductive medium. The dispersing system may also include an air inlet in the chamber; and an air pump configured to pump an amount of air into the chamber through the air inlet, the amount of air being sufficient to provide a positive pressure on the recombined ionically conductive medium in the chamber According to another aspect of the present invention, there is provided an electrochemical cell system. The cell system may have a plurality of electrochemical cells, each comprising (i) a fuel electrode comprising a metal fuel; and (ii) an oxidant electrode spaced from the fuel electrode. The cell system may further have an ionically conductive medium for conducting ions between the fuel and oxidant electrodes to support electrochemical reactions at the fuel and oxidant electrodes. The cell system may additionally have a circulation path for flowing the ionically conductive medium through and among the cells. In the cell system, the fuel electrode and the oxidant electrode are configured to, during discharge, oxidize the metal fuel at the fuel electrode and reduce an oxidant at the oxidant electrode to generate a discharge potential difference therebetween for application to a load. The cell system may further have a dispersing system positioned along the circulation path and configured to disrupt an electrical shunt current in the ionically conductive medium between at least two of the electrochemical cells. The dispersing system may include a disperser configured to separate the ionically conductive medium into a plurality of discrete droplets. The dispersing system may further have a chamber for receiving the plurality of discrete droplets, and collecting the plurality of discrete droplets to recombine into recombined ionically conductive medium. The dispersing system may also include an air inlet in the chamber; and an air pump configured to pump an amount of air into the chamber through the air inlet, the amount of air being sufficient to provide a positive pressure on the recombined ionically conductive medium in the chamber.

According to another aspect of the present invention, there is provided a method for disrupting electrical current in an ionically conductive medium. The method includes dispersing, in a chamber, the ionically conductive medium into a plurality of discrete droplets. The method additionally includes permitting, in the chamber, the plurality of discrete droplets to recombine into recombined ionically conductive medium. The method additionally includes adding an amount of air into the chamber to inhibit growth of ionically conductive foam on the recombined ionically conductive medium.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1A:
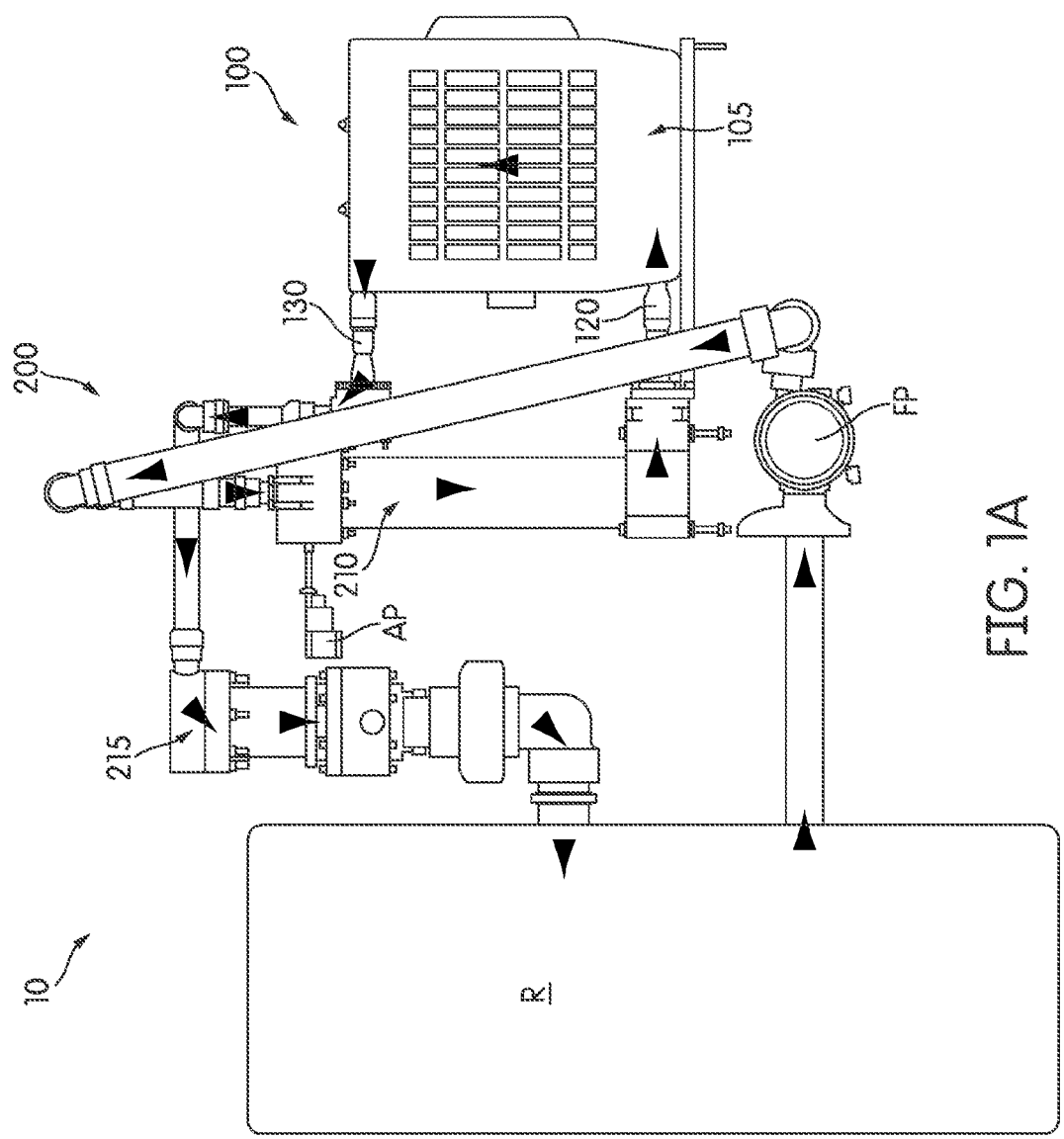
FIG. 1A illustrates a side view of an embodiment of an electrochemical cell system having an electrochemical cell module and an associated disperser system.

FIG. 1A illustrates a side view of an electrochemical cell system 10. The cell system 10 includes an electrochemical cell module 100 having a plurality of cells 105 configured to utilize an ionically conductive medium that flows therethrough to conduct ions therein. The ionically conductive medium will be described in greater detail below. It may be appreciated that the electrochemical cell system 10 depicted herein is merely exemplary, and in other embodiments the functions or components of the electrochemical cell system 10 and/or the cells 105 may vary. For example, in various embodiments, the ionically conductive medium may flow through multiple cells 105 through any appropriate mechanism, including but not limited to being pumped in a continuous or pulsed manner, or being driven by a convective flow generated by gas evolution within the cell, such as is described in U.S. Provisional Patent Application Ser. No. 61/555,982, incorporated herein in its entirety by reference. Additionally, in some embodiments portions of the electrochemical cell system 10, such as but not limited to one or more of the plurality of cells 105 therein, and/or the constituent portions thereof, may be of any suitable structure or composition, including but not limited to being formed from plastic, metal, resin, or combinations thereof. Accordingly, each electrochemical cell system 10 may be assembled in any manner, including being formed from a plurality of elements being integrally molded, or so on. In various embodiments the electrochemical cell systems 10, the cells 105 thereof, and/or the housings associated therewith may include elements or arrangements from one or more of U.S. patent application Ser. Nos. 12/385,217, 12/385,489, 12/549,617, 12/631,484, 12/776,962, 12/885,268, 13/028,496, 13/083,929, 13/167,930, 13/230,549, 13/299,167, 61/509,390, 61/515,749, 61/555,952, 61/556,000, 61/556,011, and 61/556,021, each of which are incorporated herein in their entireties by reference. As shown in the illustrated embodiment, the cell system 10 may include a reservoir R of excess ionically conductive medium and a flow pump FP configured to flow the ionically conductive medium throughout the cell system 10. As illustrated, the cell module 100 may have at least one cell inlet 120, configured to permit the ionically conductive medium to enter the cell module 100, and at least one cell outlet 130 configured to permit the ionically conductive medium to leave the cell module 100. More details of the electrochemical cell module 100 and each cell 105 will be discussed below.

As the ionically conductive medium is electrically conductive, the flow of ionically conductive medium through multiple cells 105 may cause shunt current, the parasitic or counter-productive current that flows through the ionically conductive medium within the cell system between electrodes of different cells 105, reducing an overall potential difference across the cell module 100. Physical separation of the ionically conductive medium may serve to disrupt the shunt current, by breaking the counter-productive electrical connections formed in the ionically conductive medium, creating at least some current isolation. To physically separate the ionically conductive medium in the cell system 10, the cell system 10 also includes a flow disperser system 200, which is described below.

As illustrated, the flow disperser system 200 includes an inlet disperser chamber 210 configured to disperse the flow of ionically conductive medium prior to entering the cell module 100 through the cell inlet 120, and an outlet disperser chamber 215 configured to break up the flow of the ionically conductive medium after it exits the cell module 100 through the cell outlet 130. Although in some embodiments the flow disperser system 200 may have either the inlet disperser chamber 210 or the outlet disperser chamber 215, shunt current may be bi-directional, so current isolation on both sides of the cells 105 in the flow path of the ionically conductive medium is advantageous. As shown, inlet disperser chamber 210 may be connected to an air pump AP, as will be discussed in greater detail below. Further details of the inlet disperser chamber 210 and outlet disperser chamber 215 are also described below.

Figure 1B:
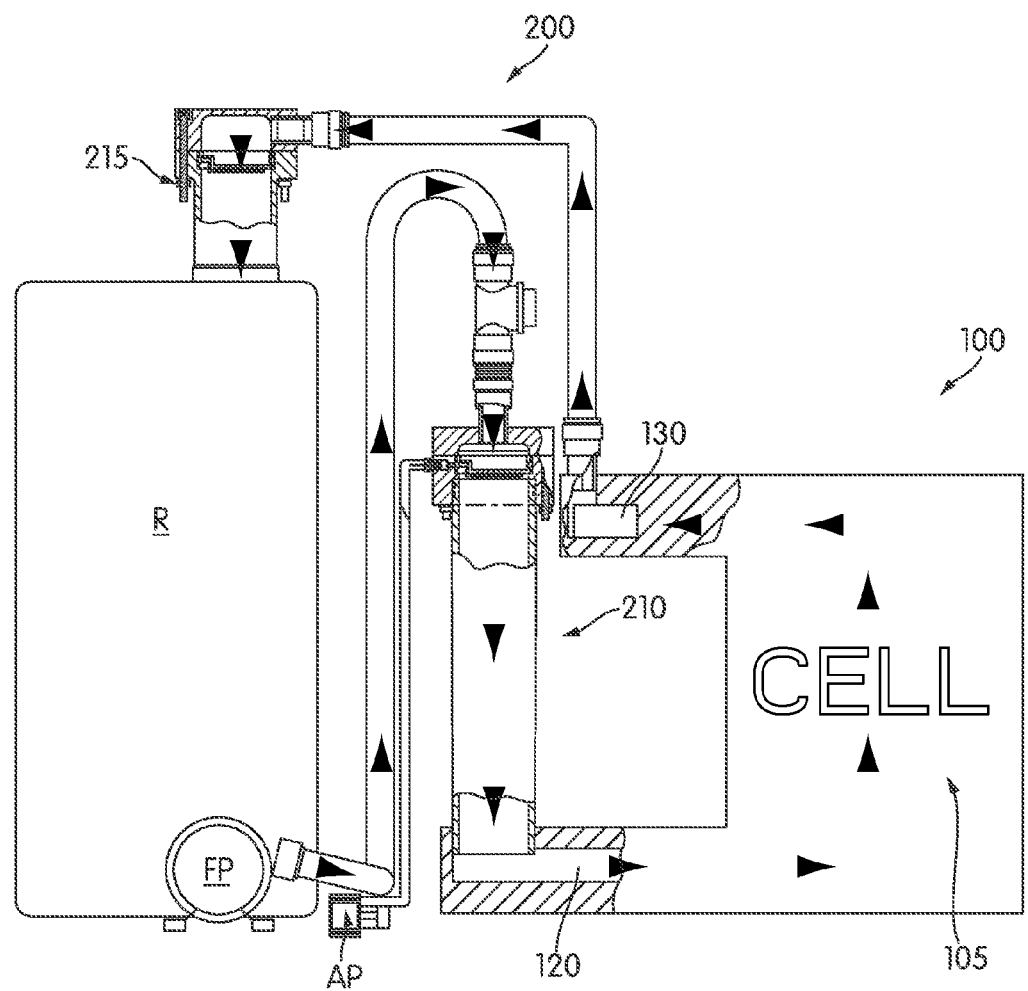
FIG. 1B schematically illustrates the electrochemical cell system of FIG. 1A, highlighting the connections between the electrochemical cell module and the associated disperser system.

FIG. 1B illustrates the flow path of the non-limiting embodiment of FIG. 1A in greater detail, and in particular shows the fluidic connections between the cell module 100 and the inlet disperser chamber 210 and outlet disperser chamber 215. The flow path of FIG. 1B is shown schematically, and thus is not intended to be limiting in any way. More details of embodiments of the flow paths of the ionically conductive medium will also be discussed below.

Figure 2:
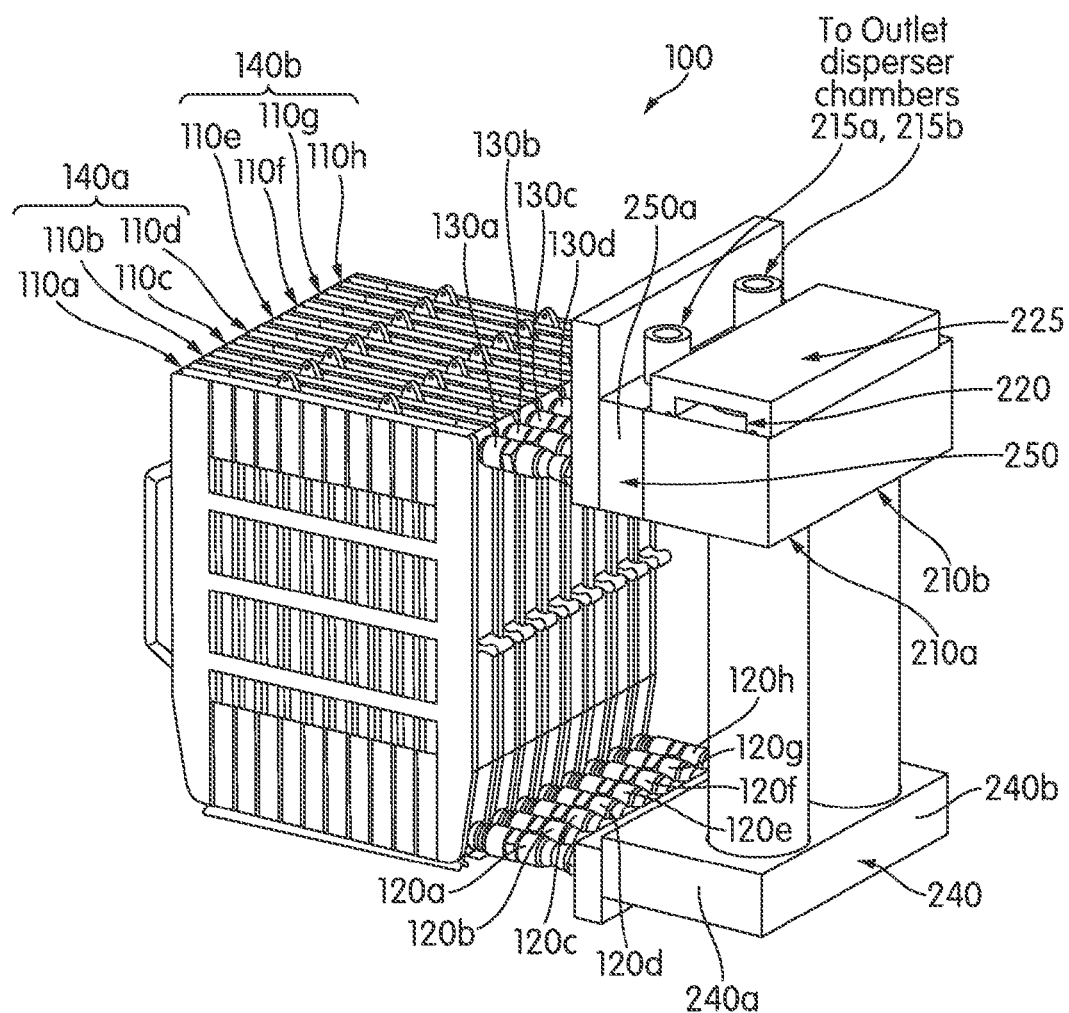
FIG. 2 illustrates an isolated perspective view of an embodiment of the electrochemical cell system and associated disperser system.

Moving to FIG. 2, in a non-limiting embodiment the cell module 100 may include at least one bicell 110, each comprising two of the cells 105 (obscured in FIG. 2). The configurations of the bicells 110 are discussed in greater detail below. In the illustrated embodiment, the cell module 100 includes eight bicells 110*a-h*. Although eight are depicted, any number may be used. As the embodiment of FIG. 2 depicts, each bicell 110 may be associated with one of the cell inlets 120 that permit the ionically conductive medium to enter the bicell 110. In the illustrated embodiment showing the bicells 110*a-h*, each cell inlet 120 is individually designated as cell inlets 120*a-h*. Likewise, each bicell 110 may be associated with one of the cell outlets 130 that permits the ionically conductive medium to exit the bicell 110 as the ionically conductive medium is pumped up through the cell module 100. In the illustrated embodiment, the bicells 110*a-h* are associated with corresponding cell outlets 130*a-h* (wherein cell outlets 130*e-h* are obscured in the Figure). In an embodiment the ionically conductive medium, flowing in from single inlet 120, may be divided in the bicell 110 to flow through both cells 105 in parallel, and recombine to flow out a single outlet 130.

As shown in the illustrated embodiment, the disperser system 200 includes two inlet disperser chambers 210 (individually 210*a* and 210*b*), that are located in the flow path of the ionically conductive medium before the cell inlets 120. As shown, ionically conductive medium may enter the inlet disperser chambers 210 from the reservoir R (and flow pump FP) through a disperser system inlet 220, where the ionically conductive medium may be divided to the multiple inlet disperser chambers 210 (i.e. inlet disperser chambers 210*a-b*) through an inlet disperser manifold 225 (the internal configuration of which is obscured in FIG. 2). In an embodiment, as shown, each inlet disperser chamber 210 may be associated with a particular sub-set of the bicells 110 (i.e. a bicell set 140). For example, in the illustrated embodiment, wherein there are eight bicells 110*a-h* and two inlet disperser chambers 210*a-b*, a first bicell set 140*a* may comprise bicells 110*a-d*, and may be associated with inlet disperser chamber 210*a*, while a second bicell set 140*b* may comprise bicells 110*e-h*, and may be associated with inlet disperser chamber 210*b*. Although omitted from FIG. 2, first bicell set 140*a* may be further associated with outlet disperser chamber 215*a*, while second bicell set 140*b* may be further associated with outlet disperser chamber 215*b*.

Figure 3:
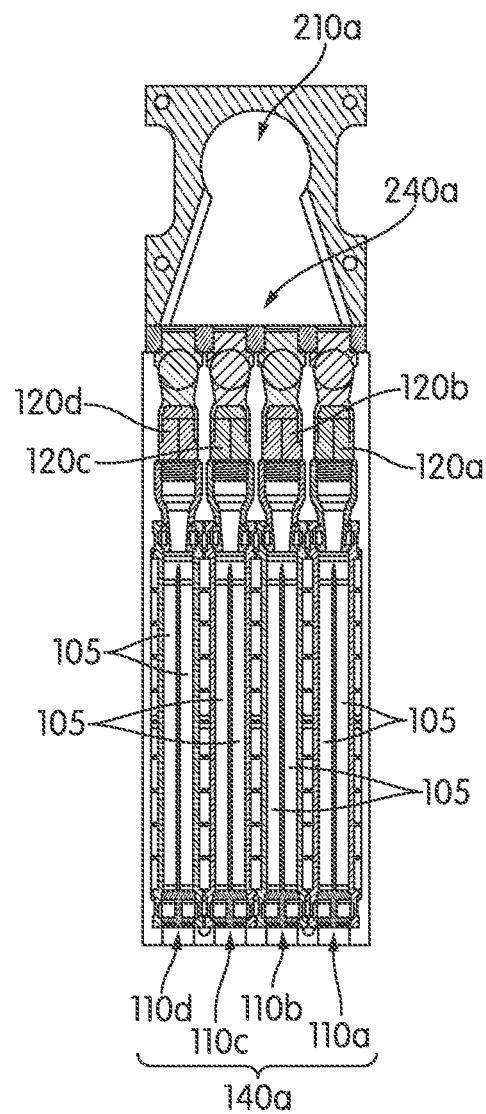
FIG. 3 illustrates a top cross-sectional view of a base of the disperser system configured to permit ionically conductive medium to flow into a plurality of electrochemical cells of the cell system.

Although the internal configuration is obscured in FIG. 2, at least one inlet manifold 240 may be configured to divide the flow paths of ionically conductive medium that exits each inlet disperser chamber 210 such that the ionically conductive medium passes through each bicell 110 of each bicell set 140 in parallel. Shown in FIG. 3 is a top view showing inlet manifold 240*a*, associated disperser chamber 210*a*, and associated cells 105 of bicell set 140*a*. As shown, the ionically conductive medium may exit the base of inlet disperser chamber 210*a*, wherein it may be divided by inlet manifold 240*a*, so that it enters cell inlets 120*a-d* of the bicells 110*a-d* of bicell set 140*a* in parallel. Returning to FIG. 2, although not shown in isolation, it may likewise be the case that inlet manifold 240*b* has the same construction as inlet manifold 240*a*, and thus divides the ionically conductive medium as it exits disperser chamber 210*b* so that it enters cell inlets 120*e-h* of the bicells 110*e-h* of bicell set 140*b* in parallel. Once the ionically conductive medium has passed through the cell module 100, and exited in parallel through cell outlets 130 associated with each bicell set 140, it may be recombined by at least one outlet manifold 250.

The internal structure of the outlet manifold 250 is also obscured in FIG. 2. Functioning in reverse to inlet manifold 240, each outlet manifold 250, such as outlet manifold 250*a* associated with bicell set 140*a*, may receive ionically conductive medium from cell outlets 130*a-d*, recombining the ionically conductive medium to send to associated outlet disperser chamber 215*a*, which is not shown in FIG. 2. Likewise, outlet manifold 250*b* (obscured in FIG. 2), may recombine ionically conductive medium that has passed through bicell set 140*b* and cell outlets 130*e-h* (obscured in FIG. 2), permitting the ionically conductive medium to flow towards outlet disperser chamber 215*b* (also not shown in FIG. 2).

Although some shunt current may still occur between cells 105 in the bicell 110, or between cells 105 in the set 140, the effect of such shunt current on the cell module 100 is generally greatest between the first and last cells 105 in cell module 100 (i.e., in the illustrated embodiment, shunt current that would exist between the first cell 105 of bicell 110*a* and the last cell 105 of bicell 110*h*). To more completely prevent shunt current, in some non-limiting embodiments, inlet manifolds 240 and outlet manifolds 250 might not be used, and each cell 105 or bicell 110 may have their own associated inlet disperser chamber 210 and/or outlet disperser chamber 215, as described in greater detail below. In other embodiments, minimal shunt current may be permissible, and disperser system 200 of the cell system 10 may include as few as one inlet disperser chamber 210 and/or outlet disperser chamber 215 to prevent or reduce shunt current between the first cell 105 and the last cell 105 of the series in cell module 100. The use of bicells 110, and/or the use of inlet manifolds 240 and outlet manifolds 250 to associate multiple cells 105 with each inlet disperser chamber 210 and/or outlet disperser chamber 215 is optional, and not intended to be limiting in any way. Thus, in various embodiments, sets of the cells 105 or bicells 110 may be fluidly connected in series, in parallel, or combinations thereof. The assembly of the cells 105 and/or bicells 110 may be configured to reduce current leakage, or to minimize it to an acceptable level. In some embodiments, the cells 105 connected in series may have a serpentine, high resistance electrolyte path between them, and each module 100 with the flow connected in parallel may utilize inlet disperser chambers 210 and/or outlet disperser chambers 215 therebetween for isolation.

Figure 4:
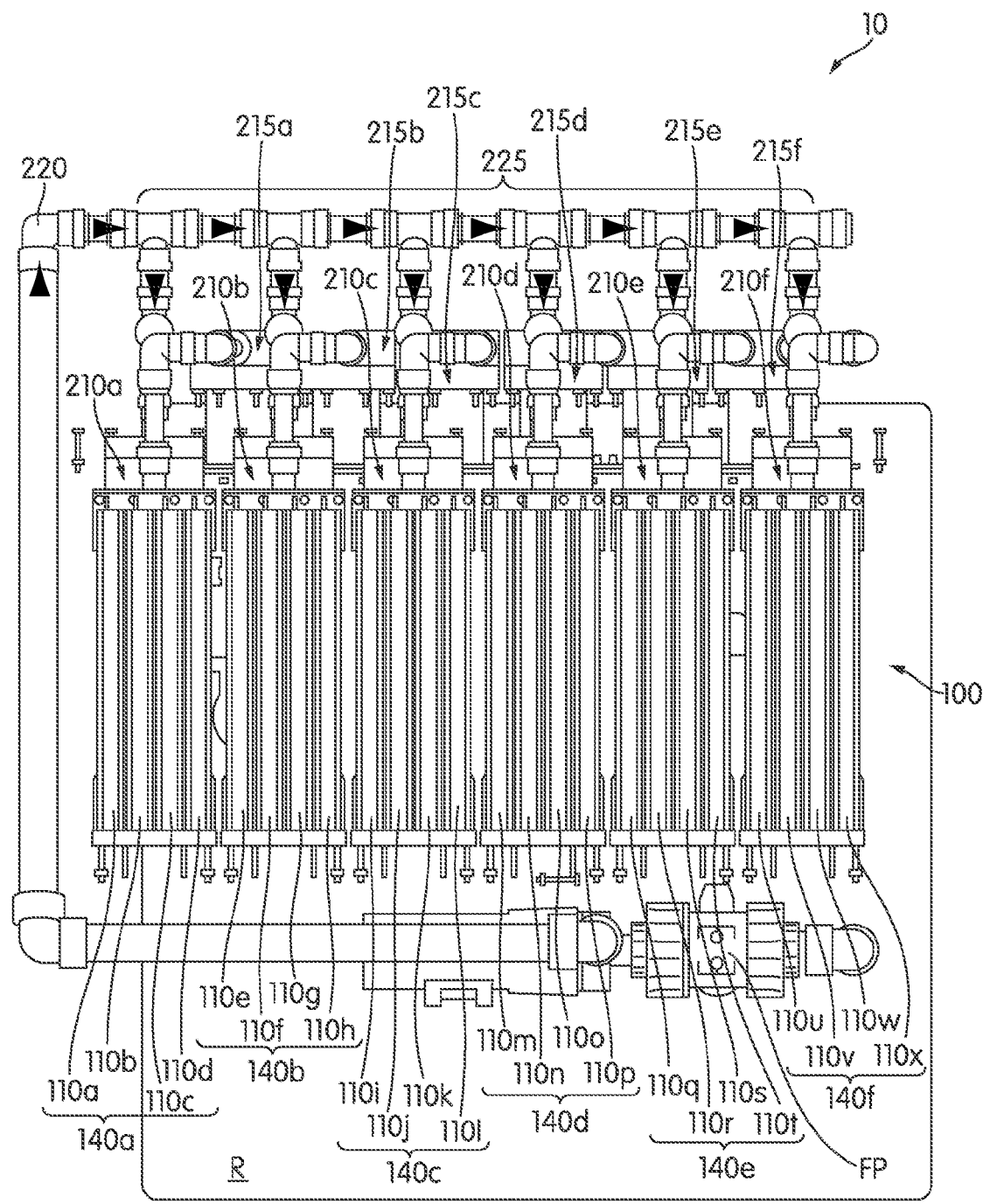
FIG. 4 illustrates a front view of another embodiment of the electrochemical cell system.

Shown in FIG. 4 is a front view of another embodiment of the electrochemical cell system 10 including twenty-four bicells 110*a-x* grouped into six bicell sets 140*a-f*. Again, each bicell set 140*a-f* has an associated inlet disperser chamber 210*a-f* and outlet disperser chamber 215*a-f*. As shown, the flow pump FP may be mounted to the reservoir R, and may flow the ionically conductive medium above the cell module 100. The ionically conductive medium may enter disperser system inlet 220, where it may be divided to each of the disperser inlet chambers 210*a-f* by inlet disperser manifold 225. The ionically conductive medium may then be dispersed by inlet disperser chambers 210*a-f* before entering each associated bicell set 140*a-f*, as is described above and illustrated in FIG. 3. After being pumped through the bicell sets 140*a-f*, the ionically conductive medium may enter outlet disperser chambers 215*a-f*, before reentering the reservoir R. Again, other configurations of the electrochemical cell system 10 are also possible, and the illustrated embodiment is not intended to be limiting in any way.

Figure 5:
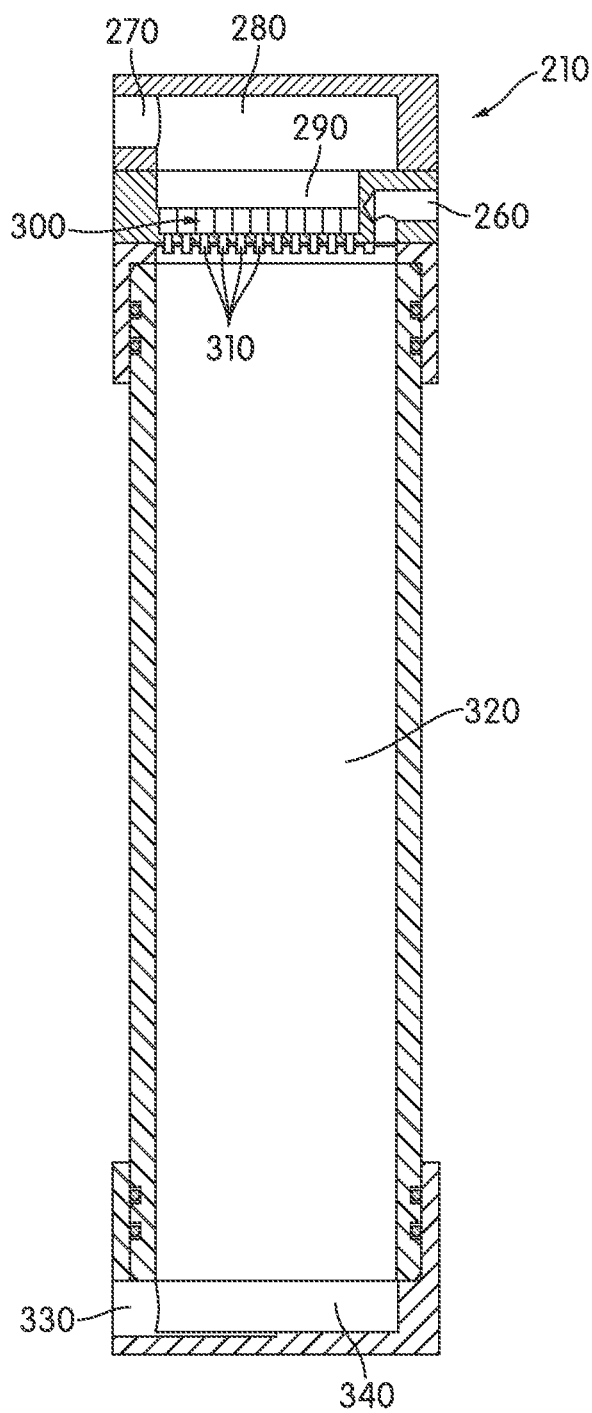
FIG. 5 illustrates a side cross-sectional view of an embodiment of a disperser chamber of the disperser system.
Figure 6:
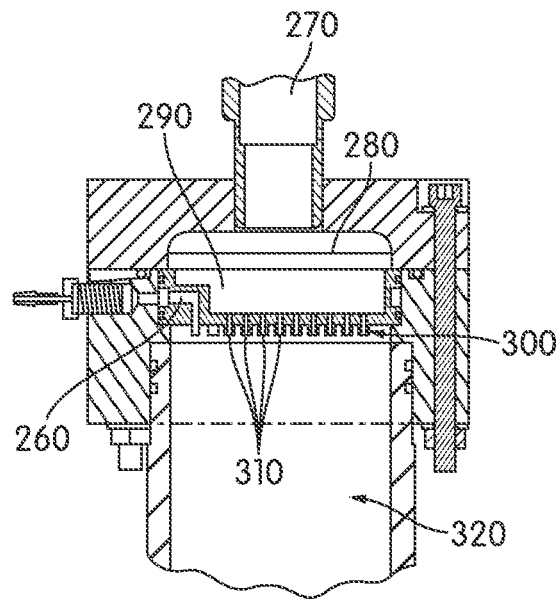
FIG. 6 illustrates a cutaway view of another embodiment of the disperser chamber of FIG. 5.

FIG. 5 shows an embodiment of the inlet disperser chambers 210 in greater detail. As shown, each inlet disperser chamber 210 includes an air inlet 260 and a chamber fluid inlet 270. The function of air inlets 260, which may be connected to the air pump AP, is discussed in greater detail below. As shown in the illustrated embodiment, ionically conductive medium may enter the inlet disperser chamber 210 through the chamber fluid inlet 270. The chamber fluid inlet 270 may open into any upper area of the inlet disperser chamber 210 including but not limited to a side of the inlet disperser chamber 210, as shown in the embodiment of FIG. 5, the top of the inlet disperser chamber 210, as shown in the embodiment of FIG. 6, or so on. In an embodiment, the ionically conductive medium may enter inlet disperser chamber 210 via chamber fluid inlet 270 from disperser system inlet 220. In embodiments wherein there are multiple disperser chambers 210, the ionically conductive medium may enter multiple chamber fluid inlets 270 via the inlet disperser manifold 225.

The flow of ionically conductive medium into the chamber fluid inlet 270 may be of any suitable rate. In various embodiments, the flow rate may be dependent upon any number of considerations, including but not limited to the configuration of a flow pump FP, the size and shape of the entrance of the chamber fluid inlet 270, the size and shape of the flow path prior to the inlet disperser chamber 210, and/or the properties of the ionically conductive medium such as density, viscosity and ambient conditions such as temperature and pressure. In an embodiment, the ionically conductive medium may flow into each chamber fluid inlet 270 at a rate of approximately two liters per minute.

Returning to FIG. 5, once the ionically conductive medium passes through the chamber fluid inlet 270, it may enter a pre-dispersal chamber 280. The size and shape of the pre-dispersal chamber 280 may, in an embodiment, be configured to slow the flow of the ionically conductive medium. In some embodiments, the pre-dispersal chamber 280 may be configured to house a reservoir of ionically conductive medium. In other embodiments, the pre-dispersal chamber 280 may be configured to maintain air therein, such as an air bubble, so that a pool of ionically conductive medium may form. In an embodiment, such a pool of ionically conductive medium may be contained in a lower portion 290 of pre-dispersal chamber 280.

Situated below the lower portion 290 of the pre-dispersal chamber 280 may be a disperser 300. The disperser 300 may be configured to break up the flow of the ionically conductive medium into a shower or a spray, such that any electrical connection formed in the ionically conductive medium, including but not limited to shunt current, is broken by the spacing between individual droplets of ionically conductive medium. The disperser 300 may take any suitable shape or construction, and in an embodiment may include one or more nozzles 310 through which the ionically conductive medium may be dispersed through. The dispersed ionically conductive medium may then fall into a post-dispersal chamber 320 as discrete droplets, like a showerhead, disrupting any electrical current from flowing therethrough. In an embodiment, the post-dispersal chamber 320 may be an enclosed chamber of any suitable shape, of sufficient length to permit discrete droplets of ionically conductive medium to fall through and separate from one another as individual droplets. At the bottom of the post-dispersal chamber 320 may be a chamber fluid outlet 330, which may reconnect with the flow path to permit the ionically conductive medium to continue through the cell module 100. Like the chamber fluid inlet 270, the chamber fluid outlet 330 may be located on a side of the inlet disperser chamber 210, or on the bottom of the inlet disperser chamber 210.

In an embodiment, gravity drives the fall of the ionically conductive medium through the inlet disperser chamber 210, and the chamber fluid outlet 330 will be located below (i.e. along the direction of gravitational force) the chamber fluid inlet 270. In an embodiment, another flow pump FP may draw ionically conductive medium from the chamber fluid outlet 330 to the cell module 100. In other embodiments, flow pressure may push the ionically conductive medium through the disperser 300, or a combination of flow pressure and gravity may drive the ionically conductive medium through the disperser 300. In an embodiment, air pressure in the post-dispersal chamber 320 created through the inlet of air from air inlet 260 may maintain a pressure head on the ionically conductive medium to continue to drive the flow of the ionically conductive medium through the cell module 100 and the remainder of the flow path of cell system 10, such that a flow pump FP between the reservoir R and the inlet disperser chamber 210 is capable of pumping ionically conductive medium through the cell system 10 back to reservoir R, as was shown in FIG. 1.

As ionically conductive medium falls through the post-dispersal chamber 320 of the inlet disperser chamber 210, it may pool at a lower portion 340 of the post-dispersal chamber 320, before flowing out into the flow path through the chamber fluid outlet 330. In an embodiment, the lower portion 340 of the post-dispersal chamber 320 may be integrally formed with the inlet manifold 240, similar to the configuration of the base of the inlet dispersal chamber 210a shown in FIG. 3. Returning to FIG. 5, in various embodiments, the shape, size, number, and configuration of the one or more nozzles 310 of the disperser 300 may be configured so as to modify the flow rate such that a generally constant flow rate for the ionically conductive medium is provided out of the chamber fluid outlet 330. In an embodiment, the flow rate of the ionically conductive medium out of the chamber fluid outlet 330 may be substantially the same as the flow rate entering the chamber fluid inlet 270. In an embodiment, the shape and size of the post-dispersal chamber 320 and/or the shape and size of the chamber fluid outlet 330 may additionally or alternatively be configured to influence the flow rate of the ionically conductive medium out of the chamber fluid outlet 330.

In an embodiment, at least a portion of the inlet disperser chambers 210 are sealed. Such a sealed configuration may be to prevent electrolyte evaporation, to maintain the pressure head from the flow pump FP, or for any other reason. In an embodiment, only the post-dispersal chambers 320 of the inlet disperser chamber 210 are sealed, because of a greater likelihood of evaporation when the ionically conductive medium is in dispersed form. Such a sealed configuration of at least the post-dispersal chamber 320 may result in an increased humidity level in the post-dispersal chamber 320. Due to the nature of the ionically conductive medium, the configuration of the disperser 300, such as the configuration of the plurality of nozzles 310, humidity in the post-dispersal chamber 320, or for any other reason, foaming of the ionically conductive medium may occur in the inlet dispersal chamber 210 as the ionically conductive medium lands in the lower portion 340 of the post-dispersal chamber 320. In some cases, the foamed ionically conductive medium may conduct electricity therethrough, such as if the foamed ionically conductive medium contacts the ionically conductive medium at the nozzles 310. As such, if foaming of ionically conductive medium is not suppressed, the dispersal of the ionically conductive medium through the disperser 300 may be overcome, and electrical current, such as shunt current, through the ionically conductive medium may resume uninterrupted. Additionally, or alternatively, a pressure differential in the cell module 100 may over time absorb air in the post-dispersal chamber 320 through which the discrete droplets fall, which may reduce or eliminate the effectiveness of the inlet disperser chambers 210.

Figure 7:
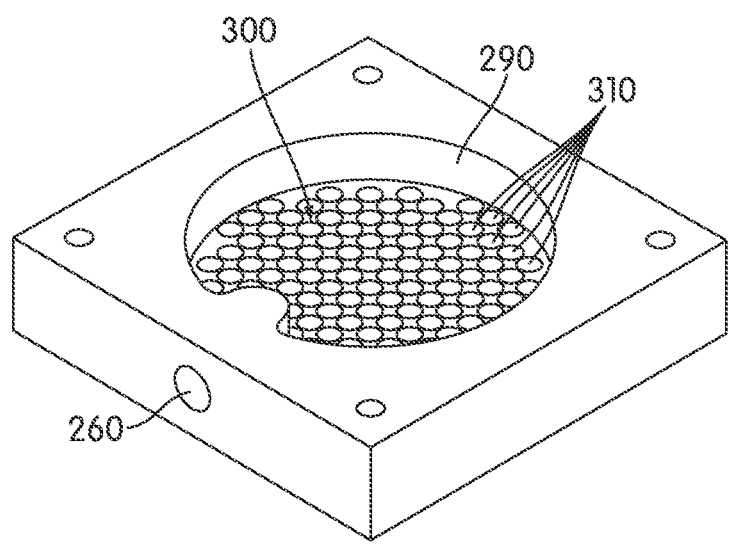
FIG. 7 illustrates an isolated view of an embodiment of a disperser of the disperser chamber.

To dampen or suppress the foaming of ionically conductive medium, and/or to maintain an amount of air in the post-dispersal chamber 320, the inlet disperser chamber 210 may further comprise the air inlets 260, as noted above. As shown, the air inlet 260 may be configured to allow air to enter the post-dispersal chamber 320 from the top, near the disperser 300. In other embodiments, the air inlet 260 may enter the side of the post-dispersal chamber 320, or any other suitable area. As seen in FIG. 7, in an embodiment the air inlet 260 may be formed together with the disperser 300, in a body that comprises the lower portion 290 of the pre-dispersal chamber 280. Returning to FIG. 5, in an embodiment, the addition of pressurized air to the post-dispersal chamber 320 above the pool of ionically conductive medium that forms in the lower portion 340 may pressurize the post-dispersal chamber to suppress the foaming of the ionically conductive medium, preventing the ionically conductive medium to rise as foam through the post-dispersal chamber 320. In an embodiment, air may enter the air inlet 260 at a rate of approximately twenty milliliters per minute. In various embodiments, and at various times, the rate of air flow may differ. Thus, the rate of air flow is not limited. In some embodiments, however, the rate of air flow may range from 1 ml to 50 ml per minute per liter per minute of electrolyte flow. In an embodiment, the air may be pumped into the air inlet 260 by an air pump AP. In an embodiment, there may be one air pump AP for all air inlets across all inlet dispersal chambers 210, wherein the air inlets 260 are connected by one or more air manifolds, which may connect the air inlets 260 via tubing. In another embodiment there may be a plurality of air pumps AP, such that each air inlet 260 may have an associated air pump AP.

In some embodiments with a plurality of inlet disperser chambers 210, the air in each disperser chamber 210 may be affected by variations in the cells 105 or bicell sets 140 thereof, and the flow of the ionically conductive medium therethrough. In some cases, a greater pressure drop may occur in one bicell set 140 (i.e. bicell set 140a) than another bicell set 140 (i.e. bicell set 140b). Such a pressure drop may cause the pressure inside the post-dispersal chamber 320 to exceed the external pressure supplied by the air pump AP in a given inlet disperser chamber 210, reducing or eliminating the amount of air therein. In an embodiment, a check valve containing a hydrophobic material may be utilized in the inlet disperser chamber 210 to prevent leakage of ionically conductive medium through the air inlet 260 if the level of ionically conductive medium rises to an excessive height. As shown in the embodiment of FIG. 6, in some embodiments the air inlet 260 may be configured to have a sufficiently small size to create an external pressure that exceeds the internal pressure. In an embodiment, the size of the air inlet 260 nozzle may be configured to maintain a 3.5 psi airside pressure. In some embodiments, airside pressure may range from 0.1 psi above the liquid internal pressure to 1 psi above the liquid internal pressure. In an embodiment, the air inlet 260 may be configured to reduce to a diameter of a half millimeter, to maintain airside pressure. In another embodiment, air inlet 260 may comprise or be associated with a one-way valve, preventing egress of air through the air inlet 260.

In an embodiment, the air entering through the air inlet 260 may be relatively dry compared to air inside the inlet disperser chamber 210. In various embodiments, the air may have a moisture content of less than approximately 5-95%, including, for example, being approximately 50%. In an embodiment, the relative humidity of the dry air as it enters through the air inlet 260 may be approximately 5-95%, including for example, being less than approximately 70%. In an embodiment, the air may be ambient air outside the cell module 100. In an embodiment, the dry qualities of the air entering through the air inlets 260 may be configured to reduce relative humidity in the post-dispersal chamber 320 by at least approximately 10-15%. For example, the dryer air may increase surface tension of the ionically conductive medium, which may deter foam formations. In some embodiments, the air entering through air inlet 260 may reduce foaming of the ionically conductive medium both by reducing the humid conditions in the post-dispersal chamber 320 that are conducive to the formation of ionically conductive foam, and by adding a positive pressure to the air in the post-dispersal chamber 320 through which the dispersed ionically conductive medium falls, thus increasing the resistance against which the foam would attempt to form.

In some embodiments the outlet disperser chambers 215 may have a similar structure and configuration as the inlet disperser chambers 210. In those embodiments, descriptions of components of the inlet disperser chambers 210 above may also apply to analogous components of outlet disperser chambers 215. In an embodiment, however, air inlets 260 may be unnecessary for outlet disperser chamber 215, as ionically conductive medium passing through the disperser 300 of outlet disperser chamber 215 may flow directly or indirectly into a reservoir R for the ionically conductive medium, described in greater detail below. In various embodiments the reservoir R may be open, eliminating the need for an air bubble in outlet disperser chambers 215, and preventing growth of foam in the outlet disperser chamber 215. In an embodiment, the outlet disperser chamber 215 may also lack a base member, and ionically conductive medium flowing through the disperser 300 may fall directly into piping of the flow path leading to the reservoir R. In another embodiment, however, the outlet disperser chamber 215 may have an air inlet 260 that may be used if the level of ionically conductive liquid in the reservoir R reaches a height above that of the level of ionically conductive medium in the outlet disperser chamber 215.

Figure 8:
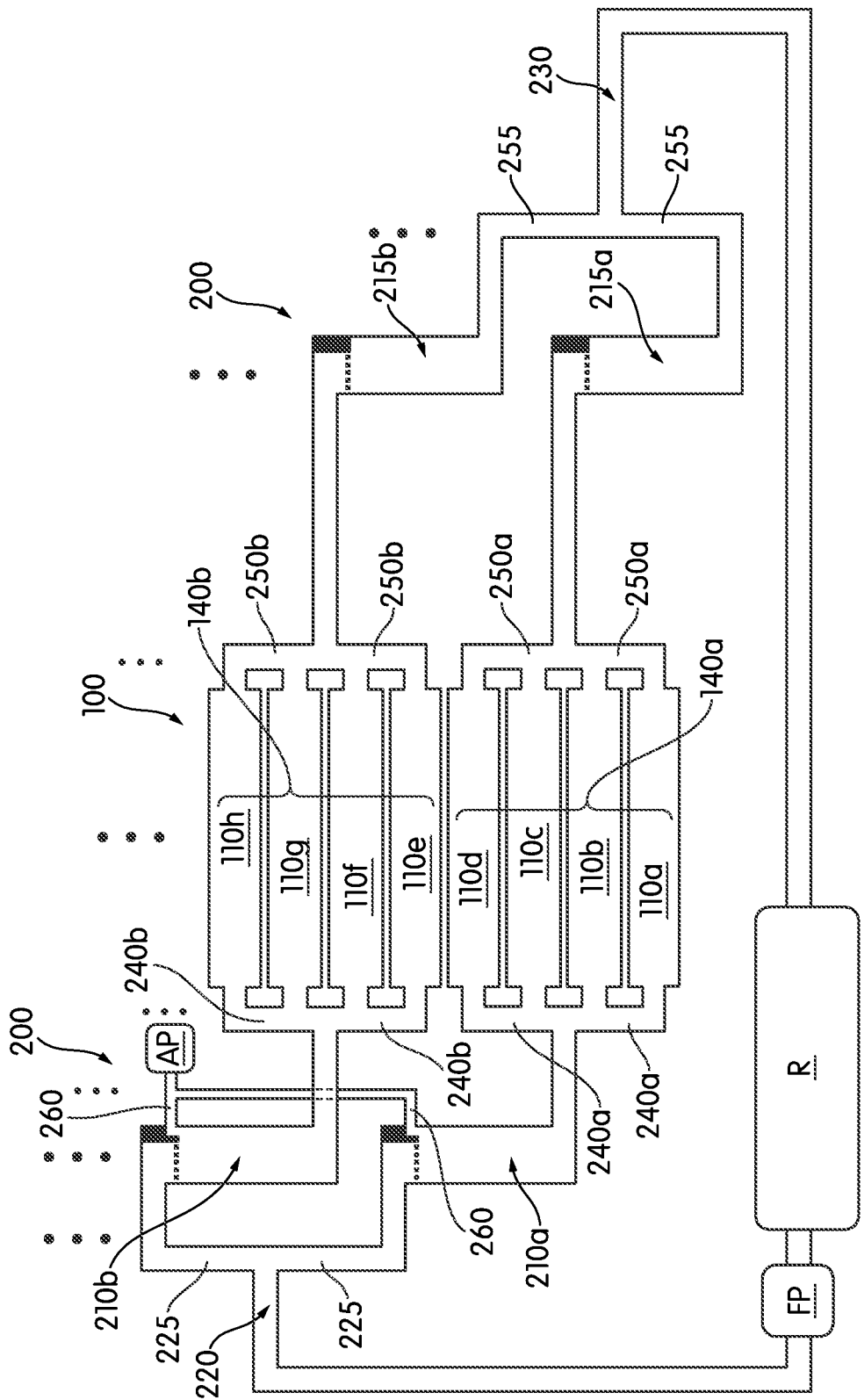
FIG. 8 illustrates a schematic view of an embodiment of a flow path for ionically conductive medium through the electrochemical cell system and associated disperser system of FIG. 1A.

FIG. 8 shows in schematic form an embodiment of the flow path of the cell module 100 and disperser system 200 of FIG. 2. As illustrated, the ionically conductive medium may be stored at reservoir R, wherein it may be pumped by flow pump FP to the disperser system inlet 220 for the disperser system 200. The ionically conductive medium may be pumped by any suitable flow pump FP or flow pumps FP that may be placed in any appropriate location along the flow path. As shown, the ionically conductive medium then branches in parallel at the inlet disperser manifold 225, wherein the ionically conductive medium flows into inlet disperser chambers 210a-b. Schematically shown is the air pump AP configured to pump air into air inlets 260 of inlet disperser chambers 210a-b. After passing through the inlet disperser chambers 210a-b, the ionically conductive fluid may be divided by associated inlet manifolds 240a-b to enter the bicells 110a-d and 110e-h of bicell sets 140a and 140b. Again, although not illustrated in the schematic view, the ionically conductive medium may be divided once more to flow in parallel through both cells 105 inside each bicell 110a-h. After passing through each of the bicells 110 a-d and 110e-h of the bicell sets 140a and 140b, the ionically conductive medium may be rejoined by associated outlet manifolds 250a-b, to flow through respective outlet disperser chambers 215a and 215b. As shown, the ionically conductive medium may then be recombined by an outlet disperser manifold 255, wherein it may flow back into reservoir R.

Although the illustrated schematic shows a long path between the chamber fluid outlet 330 and the outlet manifold 250, in an embodiment the orientation of the plurality of bicells 110a-h may permit a short distance between the base of the inlet disperser chamber 210 and the outlet manifold 250. Although the inlet and outlet flows of the ionically conductive medium are shown on opposite sides of cell module 100 in FIG. 8, this is for convenience in the non-limiting schematic representation, and is not necessarily a physical representation of the orientation of the components. As indicated by the ellipses, in some embodiments additional branches of the manifolds 225, 240, 250 and 255, and additional inlet disperser chambers 210, bicell sets 140, and outlet disperser chambers 215 may increase the size and electrical capacity of cell module 100 and/or disperser system 200. Again, as noted above, air inlets 260 may not be necessary for outlet disperser chambers 215 if there is no pressure inside the flow path between the outlet disperser chambers 215 and the reservoir R.

Figure 9:
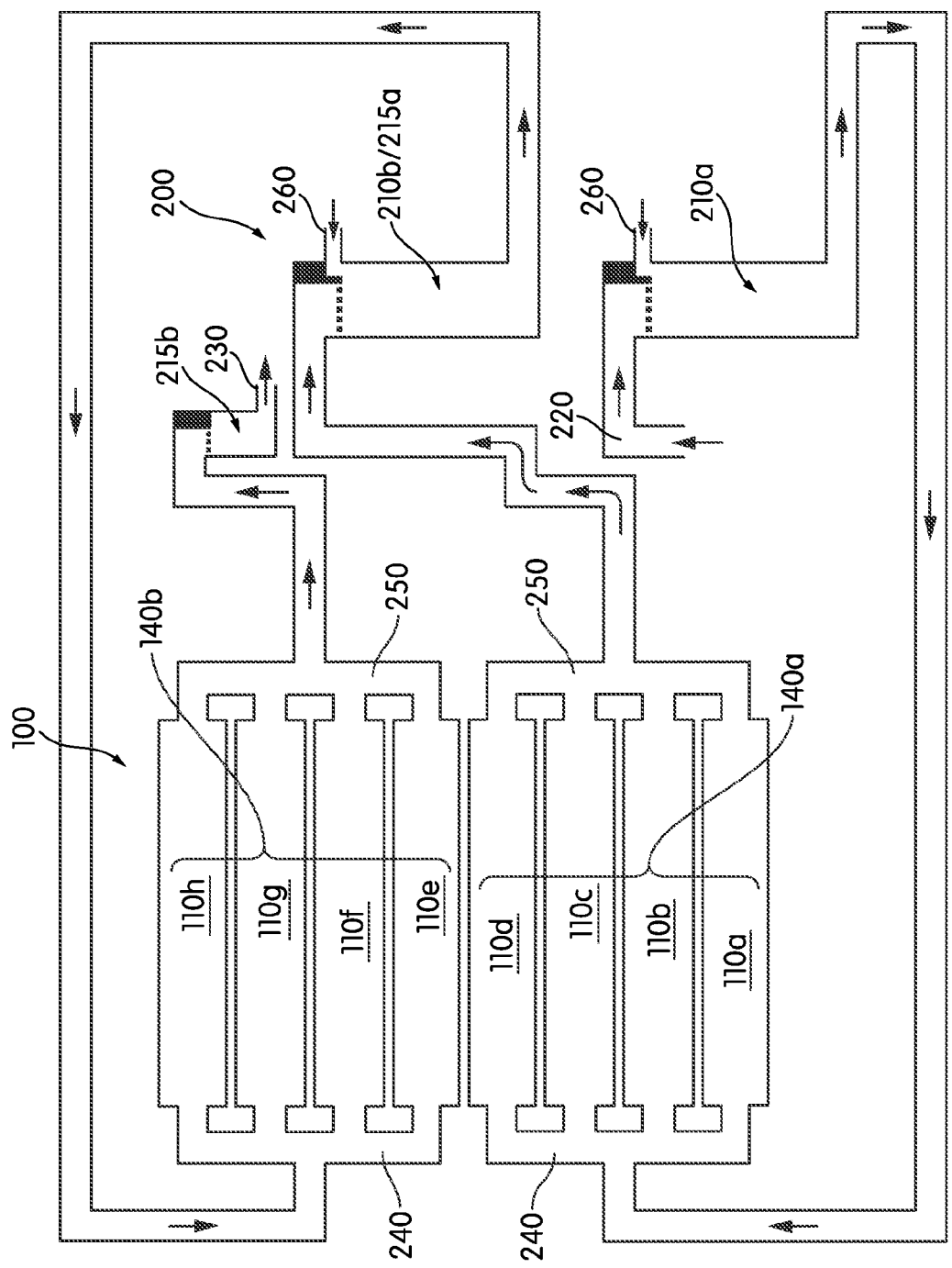
FIG. 9 illustrates a schematic view of another embodiment of a flow path for the ionically conductive medium through the electrochemical cell system and associated disperser system.

The flow path of the cell module 100 and/or the disperser system 200 may vary in different embodiments. For example, as illustrated in the embodiment of FIG. 9, each bicell set 140 may be fluidly connected to one another, such that a subsequent inlet disperser chamber 210 acts as the outlet disperser chamber 215 for a prior bicell set 140. In the illustrated embodiment, ionically conductive medium may flow from the reservoir R (not shown) into the disperser system 200 at disperser system inlet 220, wherein it be dispersed at encounter inlet disperser chamber 210a, disrupting electrical connections therein. The ionically conductive medium may then flow through the bicells 110a-d of bicell set 140a, before entering outlet disperser chamber 215a, which is also inlet disperser chamber 210b. The ionically conductive medium may continue to flow through the bicells 110e-h of bicell set 140b, before entering, in the illustrated embodiment, a final outlet disperser chamber 215b. The ionically conductive medium may then flow out from outlet disperser chamber 215b, wherein it may reenter the reservoir R (again not shown) for future recirculation. As noted above, in some embodiments each cell 105 or bicell 110 may have its own associated inlet disperser chamber 210 and/or outlet disperser chamber 215. In some embodiments, each cell 105 or bicell 110 may be fluidly connected to one another and separated by inlet disperser chambers 210, again wherein each inlet disperser chamber for a subsequent cell 105 or bicell 110 acts as the outlet disperser chamber 215 for a previous cell 105 or bicell 110.

Figure 10:
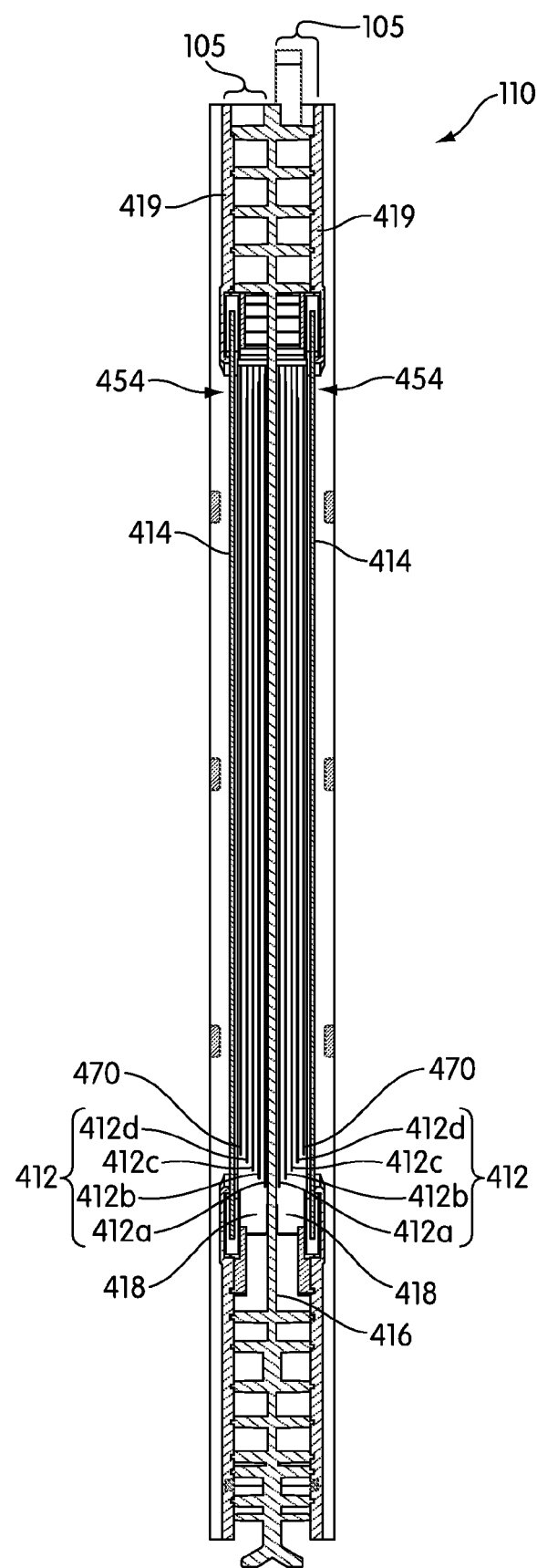
FIG. 10 illustrates a cross-sectional view of a portion of the electrochemical cell system that includes two electrochemical cells.
Figure 11:
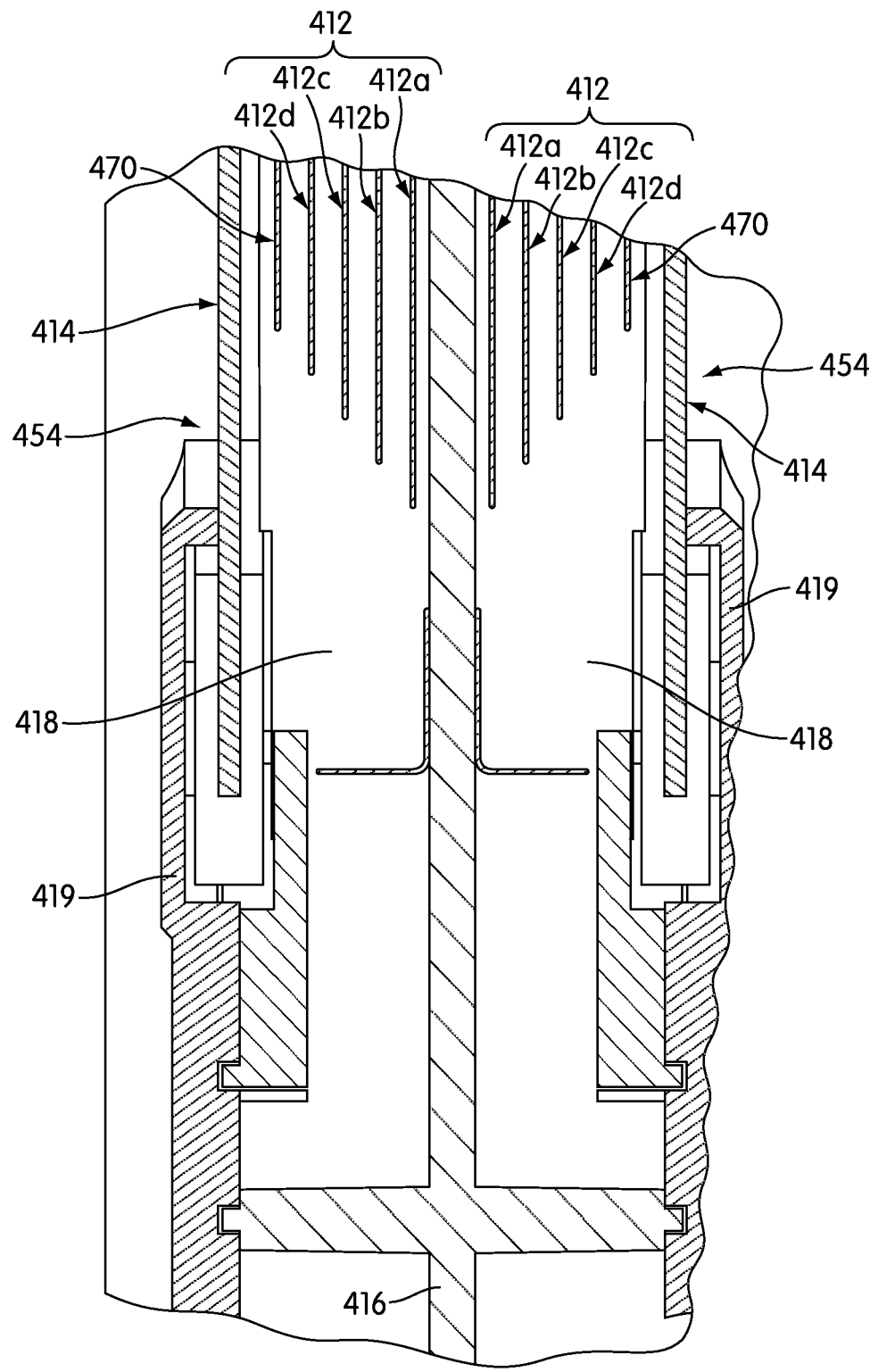
FIG. 11 illustrates an enlarged view of a portion of the view of FIG. 10.

As noted previously, each bicell 110 may be of any suitable construction or configuration. For example, in an embodiment, as illustrated in FIGS. 10 and 11, each bicell 110 may include two cells 105, each including a fuel electrode 412, and an oxidant electrode 414 that is spaced from the fuel electrode 412. In an embodiment, the cells 105 of the bicell 110 may be assembled back to back, such that the oxidant electrodes 414 of each cell 105 are distal from one another in the bicell 110. In an embodiment, the fuel electrodes 412 may be held by an electrode holder 416, as illustrated. The bicell 110 may also include a cover 419 that is used to cover at least a portion of the electrochemical cells 105 on either side of the bicell 110, while the electrode holder 416 supports and separates each cell 105 of the bicell 110, as seen in FIGS. 10 and 11.

In an embodiment, the fuel electrode 412 is a metal fuel electrode that functions as an anode when the cell 105 operates in discharge, or electricity generating, mode, as discussed in further detail below. In an embodiment, the fuel electrode 412 may comprise a permeable electrode body 412a, such as a screen that is made of any formation able to capture and retain, through electrodepositing, or otherwise, particles or ions of metal fuel from the ionically conductive medium that circulates through the cells 105 of the bicell 110.

The fuel may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present invention is not intended to be limited to any specific fuel, and others may be used. In an embodiment, the fuel may be provided to the cells 105 as particles suspended in the ionically conductive medium.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. The medium may also use a non-aqueous solvent or an ionic liquid.

The fuel may be oxidized at the fuel electrode 412 when the fuel electrode 412 is operating as an anode, and an oxidizer, such as oxygen, may be reduced at the oxidant electrode 414 when the oxidant electrode 414 is operating as a cathode, which is when the cell 105 is connected to a load and the cell 105 is in discharge or electricity generation mode. In an embodiment, all of the cells 105 in the cell module 100 may be connected in series to the load during the discharge mode. The reactions that occur during the discharge mode generate by-product precipitates, e.g., a reducible fuel species, in the ionically conductive medium. For example, in embodiments where the fuel is zinc, zinc oxide is generated as a by-product precipitate/reducible fuel species. During a recharge mode, the by-product precipitates, e.g., zinc oxide, may be reversibly reduced and deposited as the fuel, e.g., zinc, onto the fuel electrode 412, which functions as a cathode during recharge mode. During recharge mode, either the oxidant electrode 414, or a separate charging electrode 470, described below, functions as the anode.

The cells 105 are not limited to metal-air type configurations. For example, in some embodiments, the cells 105 may have any other flow-type configuration. For example, in various non-limiting embodiments, the cells 105 may include vanadium redox cells, iron-chromium cells, lithium based cells, lead-acid cells, alkaline cells, or other cells 105 utilizing a liquid flow. In some such embodiments, the fuel electrodes 412 and oxidant electrodes 414 may be configured to facilitate the presence of redox couples, including but not limited to V(V)/V(IV) and V(III)/V(II) for a vanadium flow configuration, $Zn/Zn^{2+}$ and $Br_2/Br^-$ for a zinc-bromine configuration, $Fe^{2+}/Fe^{3+}$ and $Cr^{2+}/Cr^{3+}$ for an iron-chromium configuration, $Zn/Zn^{2+}$ and $Ag/Ag^{2+}$ for a zinc-silver configuration, and $Zn/Zn^{2+}$ and $NiOOH/Ni(OH)_2$ for a Nickel-Zinc configuration.

Figure 12:
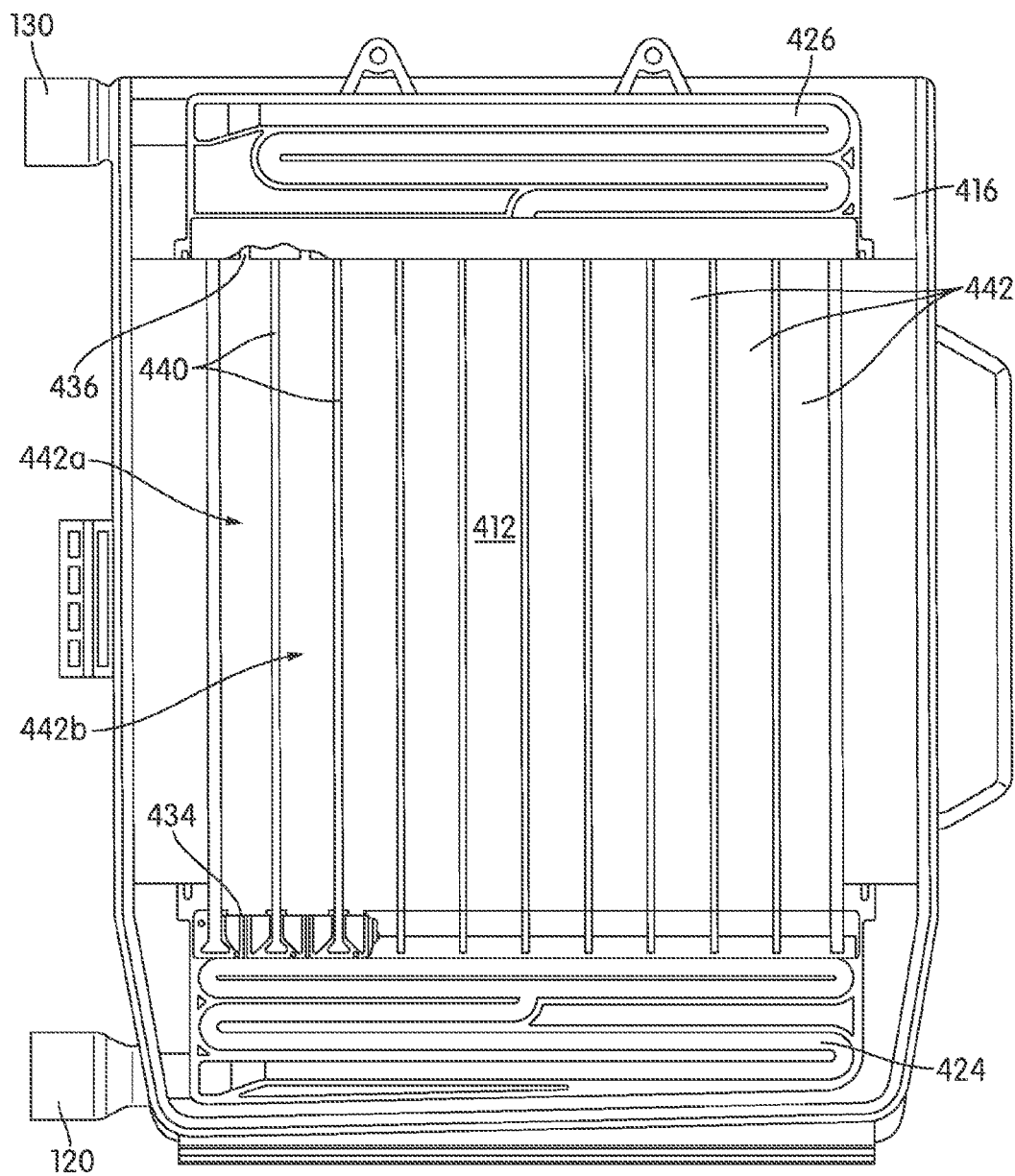
FIG. 12 illustrates a side cutaway view of the portion of the electrochemical cell system of FIG. 10, showing a fuel electrode and a plurality of spacers connected to an electrode holder.

The electrode holder 416 defines cavities 418 in which the fuel electrodes 412 are held. The electrode holder 416 may also support the cell inlet 120 and the cell outlet 130 for the bicell 110, as illustrated in FIG. 12. Again, the cell inlet 120 is configured to allow the ionically conductive medium to enter each of the cells 105. The cell outlet 130 is configured to allow the ionically conductive medium to exit the cell 105. The cell inlet 120 may be connected to the cavities 418 via an inlet channel 424, and the internal outlet 422 may be connected to the cavity 418 via an outlet channel 426. The internal inlet channel 424 and the internal outlet channel 426 may each provide a meandering tortuous path through which the ionically conductive medium may flow. The meandering path defined by the inlet channel 424 preferably does not include any sharp corners in which the flow of the medium may become stagnated or in which any particulates in the medium may collect. In some embodiments, the ionically conductive medium may ultimately enter the cavity 418 through a diffuser, such as is described in U.S. patent application Ser. No. 13/019,923, incorporated in its entirety herein by reference.

For each cell 105, a permeable seal member (not shown) may be bonded between sealing surfaces on the electrode holder 416 and/or the associated cover 419, as appropriate, to enclose at least the fuel electrode 412 in the cavity 418. The seal member also covers the inlet and outlet channels 424, 426. The seal member is non-conductive and electrochemically inert, and is preferably designed to be permeable to the ionically conductive medium in the orthogonal direction (i.e., through its thickness), without permitting lateral transport of the ionically conductive medium. This enables the ionically conductive medium to permeate through the seal member for enabling ion conductivity with the oxidant electrode 414 on the opposing side to support the electrochemical reactions, without "wicking" the ionically conductive medium laterally outwardly from the cell 105. A few non-limiting examples of a suitable material for the seal member are EPDM and TEFLON®.

As illustrated, a plurality of spacers 440, each of which extends across the fuel electrode 412 in a spaced relation to each other, may be held in place relative to the oxidant electrode 414. In an embodiment, the fuel electrode 412 may contain a plurality of permeable electrode bodies 412a-412d that may be separated by sets of the plurality of spacers 440, so that each set of spacers 440 is positioned in between adjacent electrode bodies to electrically isolate the electrode bodies 412a-412d from each other. Within each set of spacers 440 between adjacent electrode bodies, the spacers 440 are positioned in a spaced relation in a manner that may create so-called "flow lanes" 442 therebetween, as illustrated in FIG. 12. The flow lanes 442 are three-dimensional and have a height that is substantially equal to the height of the spacers 440. In an embodiment, the spacers 440 may be provided by a single frame that has cut-outs corresponding to the flow lanes. In an embodiment, the flow lanes may include a foam or honeycomb-type structure that is configured to allow the ionically conductive medium to flow therethrough. In an embodiment, the flow lanes may include an array of pins that are configured to disrupt the flow of the ionically conductive medium through the flow lanes. The illustrated embodiments are not intended to by limiting in any way.

The spacers 440 are non-conductive and electrochemically inert so they are inactive with regard to the electrochemical reactions in the cell 105. The spacers 440 are preferably sized so that when they are connected to the electrode holder 416, the spacers 440 are in tension, which allows the spacers 440 to press against the fuel electrode 412, or one of the electrode bodies 412a-412d, so as to hold the fuel electrode 412 or bodies thereof in a flat relation relative to the electrode holder 416. The spacers 440 may be made from a plastic material, such as polypropylene, polyethylene, noryl, fluoropolymer, etc. that allows the spacers 440 to be connected to the electrode holder 416 in tension.

Once the spacers 440 have been connected to the electrode holder 416, the flow lanes 442 are defined across the cavity 418 of the electrode holder 416. The spacers 440 are configured to essentially seal off one flow lane 442a from an adjacent flow lane 442b, that is separated by one of the spacers 440 so that the ionically conductive medium is guided to generally flow in substantially one direction. Specifically, the ionically conductive medium may generally flow in a first direction across the fuel electrode 412, from the inlet channel 424 to the outlet channel 426. A suitable pressure differential may be provided so that the ionically conductive medium may flow from the inlet channel 424, across the cavity 418, and to the outlet channel 426, even when the cell 105 is oriented such that the flow is substantially upward and against gravity. In an embodiment, the ionically conductive medium may also permeate through the fuel electrode 412, or an individual permeable electrode body 412a-412d, in a second direction and into a flow lane that is on the opposite side of the fuel electrode 412 or permeable electrode body 412a-412d.

To discharge the cell 105, the fuel electrode 412 is connected to an external load L so that electrons given off by the fuel as the fuel is oxidized at the fuel electrode 412 flow to the external load L. In an embodiment, the external load L may be coupled to each of the permeable electrode bodies 412a-412d in parallel, as described in detail in U.S. patent application Ser. No. 12/385,489, filed on Apr. 9, 2009 and incorporated herein by reference. In other embodiments, the external load L may only be coupled to a terminal one of the permeable electrode bodies 412a-412d, so that fuel consumption may occur in series from between each of the permeable electrode bodies 412a-412d.

The oxidant electrode 414 functions as a cathode when the oxidant electrode 414 is connected to the external load L and the cell 105 operates in discharge mode. When functioning as a cathode, the oxidant electrode 414 is configured to receive electrons from the external load L and reduce an oxidizer that contacts the oxidant electrode 414. In an embodiment, the oxidant electrode 414 comprises an air breathing electrode and the oxidizer comprises oxygen in the surrounding air.

The oxidizer may be delivered to the oxidant electrode 414 by a passive transport system, such as that illustrated in FIGS. 10 and 11. For example, where oxygen present in ambient air is the oxidizer, simply exposing the oxidant electrode 414 to ambient air via air spacings in the cell, such as the openings that are provided by grooves 454 in the cover 419 provided on either side of the bicell 110, may be sufficient to allow diffusion/permeation of oxygen into the oxidant electrode 414. Other suitable oxidizers may be used and embodiments described herein are not limited to the use of oxygen as the oxidizer. A peripheral gasket may be positioned between the periphery of the oxidant electrode 414 and the cover 419 or electrode holder 416, as appropriate, to prevent the ionically conductive medium from leaking around the oxidant electrode 414 and into the area in the grooves 454 for air exposure.

In other embodiments, a pump, such as the air pump AP described above, may be used to deliver the oxidizer to the oxidant electrode 414 under pressure. The oxidizer source may be a contained source of oxidizer. In an embodiment, the oxygen may be recycled from the electrochemical cell module 100, such as is disclosed in U.S. patent application Ser. No. 12/549,617, incorporated in its entirety herein by reference. Likewise, when the oxidizer is oxygen from ambient air, the oxidizer source may be broadly regarded as the delivery mechanism, whether it is passive or active (e.g., pumps, blowers, etc.), by which the air is permitted to flow to the oxidant electrode 414. Thus, the term "oxidizer source" is intended to encompass both contained oxidizers and/or arrangements for passively or actively delivering oxygen from ambient air to the oxidant electrode 414.

Electricity that can be drawn by the external load L is generated when the oxidizer at the oxidant electrode 414 is reduced, while the fuel at the fuel electrode 412 is oxidized to an oxidized form. The electrical potential of the cell 105 is depleted once the fuel at the fuel electrode 412 is entirely oxidized or oxidation is arrested due to passivation of the fuel electrode. A switch may be positioned in between the oxidant electrode 414 and the load L so that the oxidant electrode 414 may be connected and disconnected from the load L, as desired.

To limit or suppress hydrogen evolution at the fuel electrode 412 during discharge mode and during quiescent (open circuit) periods of time, salts may be added to retard such a reaction. Salts of stannous, lead, copper, mercury, indium, bismuth, or any other material having a high hydrogen over-potential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution. Other additives may also or alternatively be added to the ionically conductive medium, including, but not limited to additives which enhance the electrodeposition process of the metal fuel on the fuel electrode 412, such as is described in U.S. patent application Ser. No. 13/028,496, published as U.S. Patent Application Publication No. 2011/0200893 and incorporated in its entirety herein by reference.

After the fuel in each cell 105 has been entirely oxidized, or whenever it is desirable to regenerate the fuel within the cells 105 by reducing the oxidized fuel ions back to fuel, the fuel electrode 412 and the oxidant electrode 414 may be decoupled from the external load L and coupled to a power supply PS with the use of suitable switches. The power supply PS is configured to charge the cells 105 of each bicell 110 by applying a potential difference between the fuel electrode 412 and the oxidant electrode 414 such that the reducible species of the fuel is reduced and electrodeposited onto the permeable electrode bodies 412a-412d and the corresponding oxidation reaction takes place at the oxidant electrode 414, which is typically oxidation of an oxidizable species to evolve oxygen, which may be off-gassed from the cell 105. As noted above, and as described in detail in U.S. patent application Ser. No. 12/385,489, which has been incorporated herein by reference, only one of the permeable electrode bodies, such as 412a, may be connected to the power supply PS so that the fuel reduces onto the permeable electrode body and progressively grows to and on the other permeable electrode bodies 412b-412d, one by one. The switches may control when the cell 105 operates in discharge mode and in charge mode. Additionally, further switches may be associated with each of the permeable electrode bodies 412a-d, so as to selectively determine if growth occurs in parallel, or progressively. In an embodiment, the switches may selectively remove the electrical connection to one or more of permeable electrode bodies 412a-d.

In an embodiment, the electrical connections to each of the permeable electrode bodies 412a-d may be controlled by a switching control mechanism. The control mechanism may be related to a high efficiency mode for the cell, such as is disclosed in U.S. patent application Ser. No. 13/083,929, published as U.S. Patent Application Publication No. 2011/0250512 and incorporated in its entirety herein by reference.

As noted above, in some embodiments of the cell 105, the separate charging electrode 470 is provided to function as the charging electrode, rather than the oxidant electrode 414. In some embodiments, the separate charging electrode 470 may be positioned between the fuel electrode 412 and the oxidant electrode 414, with a spacer and the seal member being positioned between the separate charging electrode 470 and the oxidant electrode 414. The spacer may be non-conductive and have openings through which the ionically conductive medium may flow.

In some embodiments, the load L may be coupled in parallel to each of the permeable electrode bodies 412a-412d of the fuel electrode 412, and also to the separate charging electrode 470 during recharge. During current generation, the fuel on the fuel electrode 412 is oxidized, generating electrons that are conducted to power the load L and then conducted to the oxidant electrode 414 for reduction of the oxidizer (as discussed above).

In some embodiments a portion of the fuel electrode 412 may be electrically separated from another portion of the fuel electrode 412 in a controlled manner, so as to create a potential difference therebetween, whereby one of the portions of the fuel electrode 412 serves as the charging electrode.

It is also possible in any of the embodiments of the invention to apply cathodic potential simultaneously to all the electrode bodies 412a-412d of the fuel electrode 412, rather than to just one to produce body-by-body progressive growth. Progressive growth emanating from one terminal may be advantageous because it may provide more density. Specifically, the growth in the previously connected electrode bodies continues as each subsequent body is connected by the progressing growth. With all the electrode bodies subject to the same potential, the growth will only occur until a short occurs between the charging electrode, which is the oxidant electrode 414 or the separate charging electrode 470 in various embodiments, and the electrode body proximate to it. Thus, it is possible to have a faster, but less dense, growth in this manner, which may be amenable to certain re-charging needs.

The embodiments of the cells 105 should not be considered to be limiting in any way and are provided as non-limiting examples of how the cell 105 may be configured to be rechargeable. U.S. patent application Ser. No. 12/885,268, filed on Sep. 17, 2010, the entire content of which is incorporated herein by reference, describes embodiments of a rechargeable electrochemical cell system with charge/discharge mode switching in the cells. As noted above, the cells 105 may be connected in series to form bicells 110, and/or bicell sets 140. In various embodiments, multiple bicell sets 140 may be electrically connected in series, utilizing the disperser system 200 to prevent electrical connection via the ionically conductive medium.

As also noted above, the fluid connections between cells 105 in the cell module 100 may vary. Additional details of embodiments of cells 105 that are connected in series are provided in U.S. patent application Ser. No. 12/631,484, filed Dec. 4, 2009 and incorporated herein by reference in its entirety. Each cell 105 in the bicell 110 may be fluidly connected to one another in series, such that an internal outlet of a first cell 105 is fluidly connected to an internal inlet of a second cell 105. Likewise, bicells 110 in a bicell set 140 may be fluidly connected to each other in series, such that cell outlet 130 of a first bicell 110 is connected to cell inlet 120 of a second bicell 110 in a bicell set 140, and so on. As above, the bicell set 140 assembled in this manner may be fluidly disconnected from other bicell sets 140 by the disperser system 200. Although bicells 110 described above have two cells 105, the present invention may be practiced with additional cells 105 stacked and fluidly connected to the illustrated cells 105 of the bicell 110, creating tricells, quadcells, or so on. Alternative and additional mechanisms to increase ionic resistance between fluidly connected cells may be utilized in the present invention, such as those discussed in U.S. patent application Ser. No. 12/631,484, incorporated herein by reference.

Figure 13:
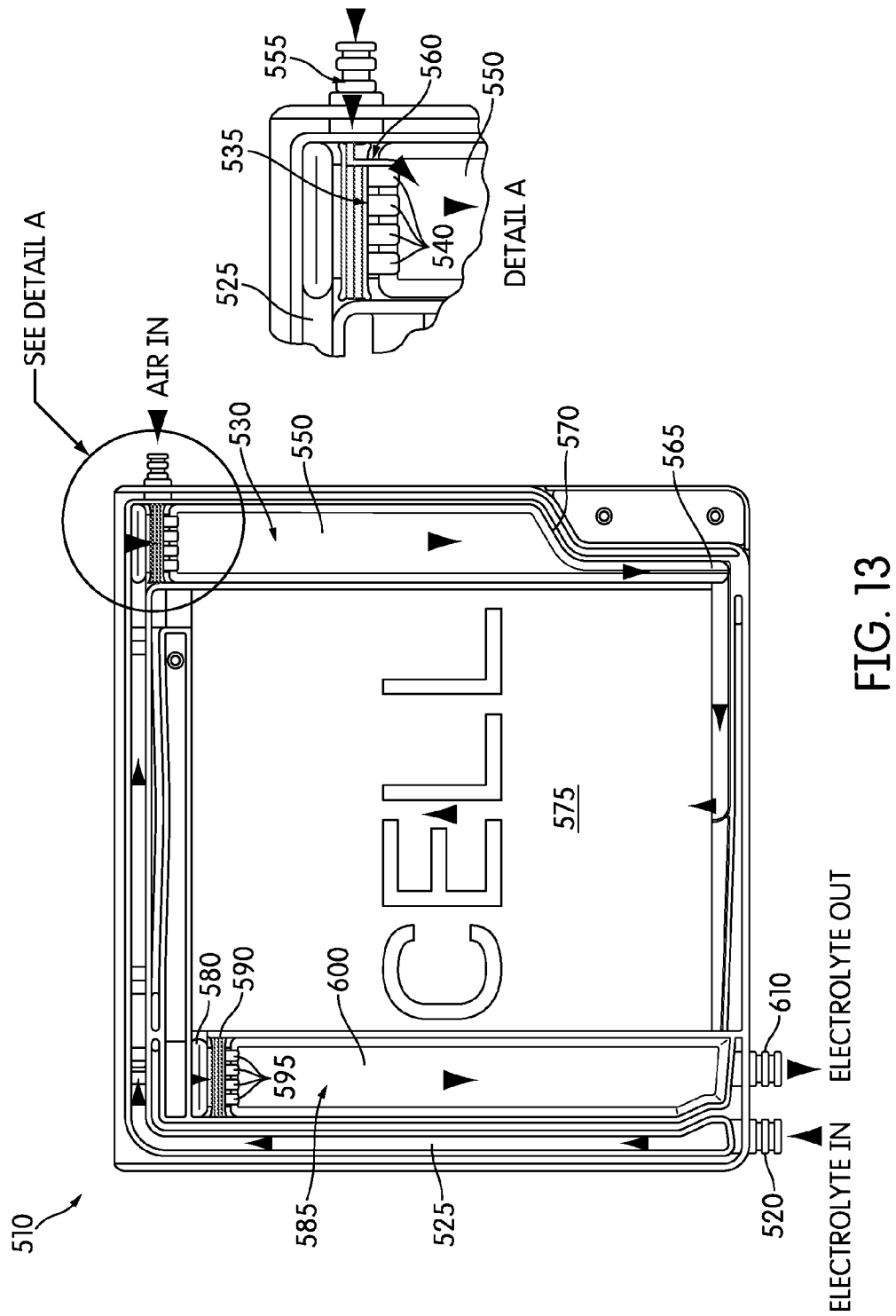
FIG. 13 illustrates an embodiment of a housing for one or more electrochemical cells having a disperser system integrated therein to disperse ionically conductive medium flowing through a flow path in the housing.

Turning now to FIG. 13, it may be appreciated that in some embodiments of the present disclosure, the housing for cells such as cells 105 may be shaped to form disperser chambers integrally therein. For example, such an embodiment may be found in FIG. 13, which schematically illustrates cell housing 510. The cell housing 510 may be of any suitable construction or configuration, including for example, being assembled from metal, plastic, rubber, resin, or combinations thereof. In the illustrated embodiment, the cell housing 510 may be integrated into an assembly of a plurality of pre-formed plastic pieces which may be sealed together to form a liquid impermeable flow path for the ionically conductive medium. Although the flow path will be described as being defined by cell housing 510, it may be understood that the containment of the liquid in the flow path may use covering side plates, described below, or other similar enclosures, to contain the ionically conductive medium within the flow path of cell housing 510.

As shown, cell housing 510 includes cell inlet 520 which is provided and arranged to connect to external piping or another fluid channel, to receive the ionically conductive medium into the cell housing 510. Once the ionically conductive medium enters cell inlet 520, it traverses inlet channel 525 towards the inlet disperser chamber 530. As shown, inlet channel 525 travels upwards (i.e. against the force of gravity), and in the illustrated embodiment extends across the upper peripheral portion of the cell housing 510 to inlet disperser chamber 530. The inlet disperser chamber 530 may be of any suitable construction or configuration, including but not limited to one similar to that of inlet disperser chamber 210 described above. At an end of inlet channel 525 distal to the cell inlet 520, the inlet channel 525 may lead into the inlet disperser chamber 530, by terminating at an inlet disperser 535 of the inlet disperser chamber 530. Inlet disperser 535 may be of any suitable construction or configuration, including but not limited to those described above for inlet disperser 300. As shown, inlet disperser 535 may include one or more nozzles 540. In various embodiments, inlet disperser 535 may vary in terms of shape, size, number, and configuration of the one or more nozzles 540. In some embodiments, the size, shape, and number of nozzles 540 in inlet disperser 535 may be determined by a flow rate of the ionically conductive medium through the cell housing 510.

Once ionically conductive medium enters the one or more nozzles 540, it will fall under the force of gravity down a lower portion 550 of the inlet disperser chamber 530, whereby the one or more nozzles 540 will disperse the flow of the ionically conductive medium to prevent the flow of electrical current through inlet disperser 535. In an embodiment, inlet disperser 535 may be configured so as to modify the flow rate such that a generally constant flow rate for the ionically conductive medium is provided through inlet disperser 535. As is shown in the Figure, an air inlet 555 is provided to bring a quantity of air into lower portion 550. In the illustrated embodiment, the inlet disperser 535 contains an air hole 560 that enters from the side of inlet disperser 535 (connecting to air inlet 555 at that point), before bending down and providing an opening to lower portion 550 alongside the nozzles 540, which extend fully through inlet disperser 535.

As ionically conductive medium falls through lower portion 550 (as discrete droplets, preventing electrical conduction therethrough), it enters post-dispersal channel 565. As shown in the illustrated embodiment of FIG. 13, the base of lower portion 550 may contain an angled base 570 that is sloped towards post-dispersal channel 565 so that gravity would pull the ionically conductive medium towards post-dispersal channel 565. The ionically conductive medium would traverse post-dispersal channel 565, which as shown partially traverses the bottom of cell housing 510, before terminating at an opening into an electrode chamber 575. Electrode chamber 575 may be of any suitable construction or configuration, including for example similar to the chamber defining cavities 416 described above.

An air pocket within the lower portion 550, which may be maintained by the inlet of air through air inlet 555, would allow ionically conductive medium in post-dispersal channel 565 (replenished by dispersed ionically conductive medium falling through the air bubble in lower portion 550) to continue to flow upwards through electrode chamber 575. In an embodiment, a degree of pressurization in the air bubble may prevent the electrolyte from foaming as it gathers at the base of lower portion 550 heading into post-dispersal channel 565. In such an embodiment, the inlet of air through air inlet 555 may prevent collapsing of the air pocket due to a pressure differential through the inlet disperser chamber 530, where the air may slowly dissolve into the ionically conductive medium, for example. In an embodiment, the flow pressure of the electrolyte may also or alternatively contribute to the pressurization, as the pressure is constant along sections of the lower portion 550 having the same cross-sectional area. In another embodiment, flow pump FP may pulse the ionically conductive medium through cell housing 510, such that any amount of electrolyte foaming or other collapse of the air pocket in lower portion 550 may be prevented. As one non-limiting example, the flow pump FP may be configured to provide a constant flow for a half hour, then stop the flow for 10 minutes, to allow foaming to settle, or to allow the air pump AP to grow the air pocket via air inlet 555. In some embodiments, a sensor may be provided in the cell housing 510 to detect the buildup of foam, or the level of the gathered ionically conductive medium as it grows through a collapsing air pocket. In some embodiments, the flow pump FP and/or the air pump AP may be configured to regulate the flow of ionically conductive medium and/or the injection of air, based on measurements obtained by the sensor. The sensor may be of any suitable construction or configuration, including for example, a sensor that identifies impedance between the electrodes of adjacent cell housings 510, a sensor that ascertains feedback of voltage or current (i.e. a current leak), a sensor that identifies electrical conductivity between two or more points within lower portion 550, or so on. In some embodiments, the sensor may simply count an interval of time.

Once the ionically conductive medium flows to the top of electrode chamber 575, it may enter a post-electrode channel 580, which leads into outlet disperser chamber 585. The post-electrode channel 585 runs below and adjacent to the transverse portion of inlet channel 525, separated by a common wall. Outlet disperser chamber 585 may be of any suitable construction or configuration, including but not limited to being similar to inlet disperser chamber 530, or outlet disperser chamber 215 described above. As shown in the illustrated embodiment, outlet disperser chamber 585 may be surrounded on either side by a portion of inlet channel 525 and the electrode chamber 575. Outlet disperser chamber 585 may include outlet disperser 590, having nozzles 595 therein. As the ionically conductive medium flows through nozzles 595, it may fall through lower portion 600, towards cell outlet 610. In an embodiment, cell outlet 610 may lead back to reservoir R, such that the flow would not back up to a degree that would make an air pocket necessary or beneficial. As is shown in the illustrated embodiment, in some such embodiments, an air inlet would not be included in outlet disperser chamber 585, as a pressure head maintained through cell housing 510 would be released when the ionically conductive medium traverses through the one or more nozzles 595. As shown in the illustrated embodiment, cell inlet 520 and cell outlet 610 may be disposed adjacent to one another, which may simplify fluidic connections between cells and/or connections to and from the reservoir R.

Figure 14:
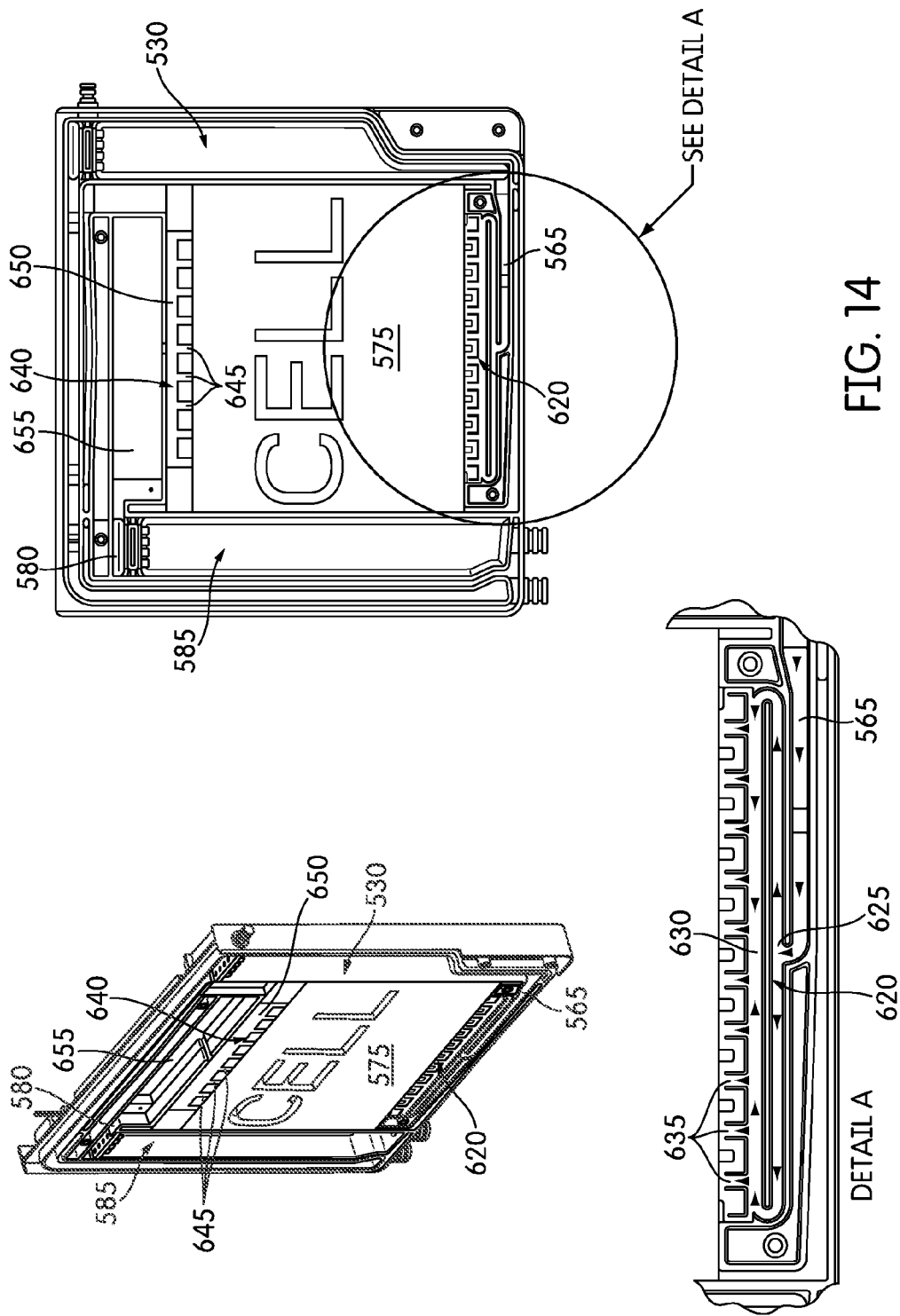
FIG. 14 illustrates the housing of FIG. 13, with flow manifolds therein to direct the flow through flow lanes associated with the one or more electrochemical cells assembled in the housing.

Similar to various embodiments of cell 110, some embodiments of cells utilizing cell housing 510 may be configured to form flow lanes along the electrodes of the cell, to direct and guide the flow of the ionically conductive medium across electrode chamber 575. As shown in FIG. 14, in some embodiments post-dispersal channel 565 may lead into flow divider 620, which may be configured to redirect the flow into the plurality of flow lanes (not shown) across the electrode chamber 575. In the illustrated embodiment the ionically conductive medium splits at T junction 625, where the flow divides in opposing directions, both directed into outlet manifold 630. In outlet manifold 630, the flow exits flow divider 620 through a plurality of flow lane outlets 635, each associated with one of the flow lanes. Although obscured in the illustrated embodiment, the flow lanes may extend across the electrodes of the cell in electrode chamber 575, before being received by a flow inlet manifold 640 comprising a plurality of flow lane inlets 645, also associated with each of the flow lanes, which lead into a flow combiner 650. In an embodiment, the flow lanes may be formed by spacers between each of the electrode bodies in the electrodes contained in electrode chamber 575, such as is described in U.S. patent application Ser. No. 12/901,401, filed Oct. 8, 2010, and incorporated herein by reference. Once the ionically conductive medium is recombined by the flow inlet manifold 640, the flow may be directed to the post-electrode channel 580, which directs the ionically conductive medium to the outlet disperser chamber 585. As shown in the illustrated embodiment, a post-electrode chamber 655 may be positioned between the post-electrode channel 580 and the flow inlet manifold 640. Post-electrode channel 580 may protrude from post-electrode chamber 655, so that ionically conductive liquid accumulated in post-electrode chamber 655 may flow into nozzles 595 of outlet disperser chamber 585.

Figure 15:
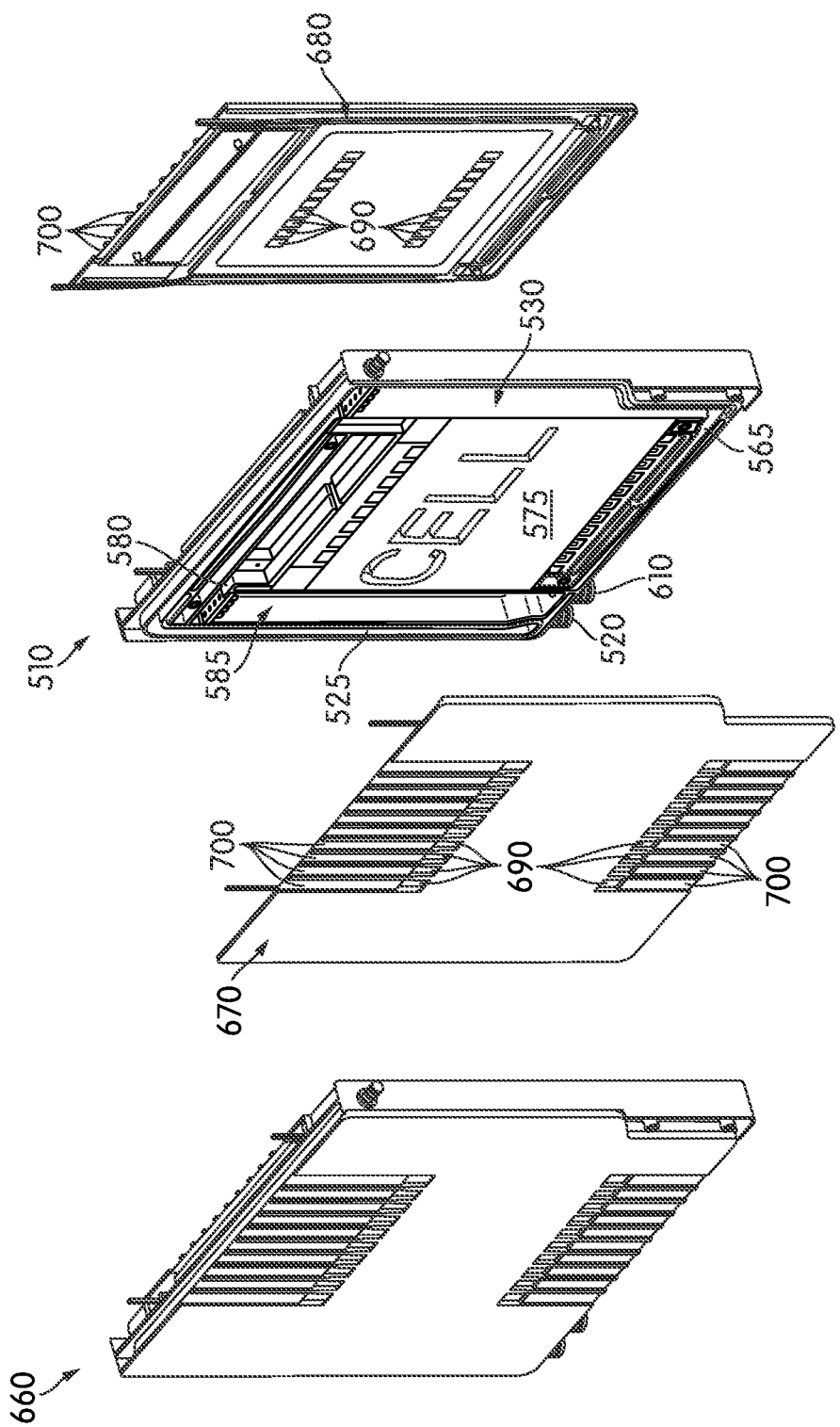
FIG. 15 illustrates a perspective and exploded view of a cell assembly showing covering plates for the housing of FIG. 13, to contain the flow within the housing, and to permit air access to one or more air cathodes of the one or more electrochemical cells.

As indicated above, in some embodiments the cell housing 510 may utilize side plates or similar bodies to seal the ionically conductive medium into the flow path defined therein. FIG. 15 depicts an assembled and an exploded perspective view of a cell assembly 660, containing the cell housing 510 sandwiched between a frontside plate 670 and a backside plate 680. As can be appreciated from the Figure, cell inlet 520, inlet channel 525, inlet disperser chamber 530, post-dispersal channel 565, post-electrode channel 580, outlet disperser chamber 585, and cell outlet 610 may all be formed in cell housing 510. In the illustrated embodiment, these channels and chambers may be formed as enclosed on three sides, such that the assembly and sealing of cell housing 510 and frontside plate 670 may define a closed flow path for the ionically conductive medium as to these elements. In an embodiment, inlet disperser 535 and outlet disperser 590 may be sealed into receptacles in the cell housing 510, so that the ionically conductive medium in the flow path is forced to traverse through nozzles 540 and nozzles 595, being dispersed by them as the ionically conductive medium falls into lower portions 550 and 600.

In an embodiment, the electrode chamber 575 and the post-electrode chamber 655 may extend through the cell housing 510, such that both the frontside plate 670 and the backside plate 680 are sealed to the cell housing 510 to contain the ionically conductive medium within the cell assembly 660 as it moves through the flow path defined therein. As shown, backside plate 680 may thus be smaller, so that less sealing material is utilized to make cell assembly 660 impermeable to the ionically conductive medium. In various embodiments, the sealing material for the frontside plate 670 and backside plate 680 may comprise or include plastic or rubber gaskets, adhesives, or any other appropriate sealant. For example, such sealants may include solvent-bond sealants, single or two-part epoxies, or UV/thermally cured epoxies. In various embodiments, the sealants may comprise sealant properties similar to those marketed as Eager Polymer EP5347 epoxy and/or MagnaTac M777 epoxy.

In an embodiment where a cell contained within cell housing 510 is of a similar electrical configuration to cells 105 above, the fuel electrode 412 may be assembled inside electrode chamber 575, while the oxidant electrode 414 may be assembled onto frontside plate 670 or backside plate 680. Although in an embodiment, cell housing 510 may be configured to contain a single cell 105, in some embodiments, multiple cells 105 may be contained therein. As is shown in FIG. 15, each of frontside plate 670 and backside plate 680 may contain air apertures 690, and associated air channels 700, which may be formed therein to allow air to reach associated oxidant electrodes 414 assembled onto each plate. In an embodiment, multiple fuel electrodes 412 may be assembled into electrode chamber 575, such that a frontside fuel electrode 412 is associated with the frontside plate 670 and its associated oxidant electrode 414, while a backside fuel electrode 412' is associated with backside plate 680 and its associated oxidant electrode 414'. In one such embodiment, the electrode bodies of frontside fuel electrode 412, associated with frontside plate 670, may be electrically separated from backside fuel electrode 412', associated with backside plate 680. Such electrical separation may include a non-conductive spacer between front side fuel electrode 412 and backside fuel electrode 412', for example. In another embodiment, a single fuel electrode 412 may be positioned inside electrode chamber 575, and associated with both of the oxidant electrodes 414 and 414'. In such a fuel electrode assembly, during charging, fuel may grow from a common terminal electrode body 412a, in opposite directions, through pairs of intermediate electrode bodies 412b and 412b', 412c and 412c', and so on, that are associated with each of frontside oxidant electrode 414 and backside oxidant electrode 414'.

Figure 16:
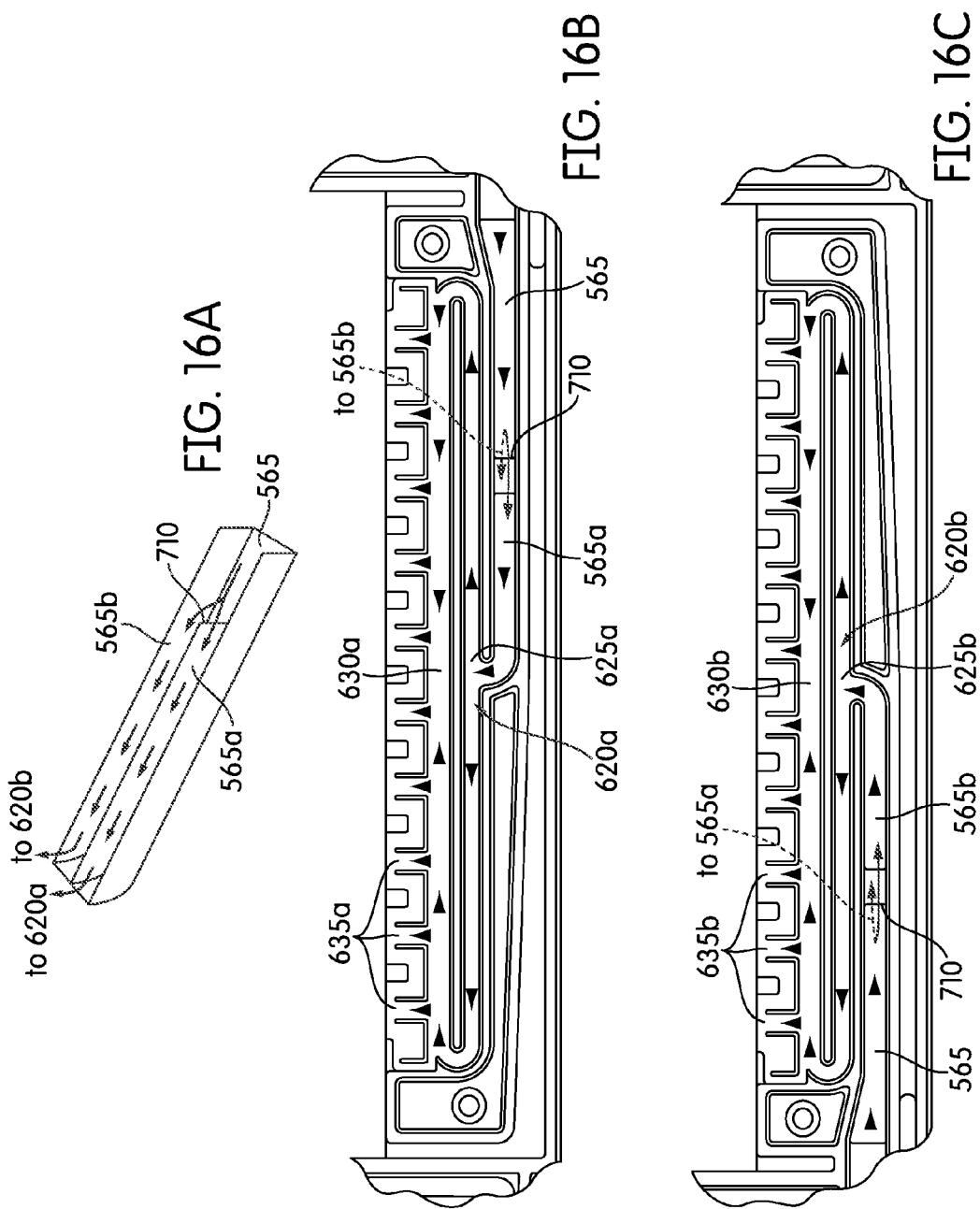
FIG. 16A-C illustrates perspective and side views of flow splitter to divide flow of ionically conductive medium within the housing of FIG. 13 into opposing faces of the housing.

In some embodiments where multiple cells are formed in cell assembly 660, any amount of shunt current traveling therebetween may be negligible as compared to the expense and increased complexity of having distinct inlet disperser chambers 530 and outlet disperser chambers 585 for each cell 105. In an embodiment, separate flow lanes for electrode bodies associated with frontside plate 670 and backside plate 680 may make desirable separate flow dividers 620. For example in the embodiment of FIGS. 16A-C, common fork 710 may be provided to divide a common post-dispersal channel 565 into frontside post-dispersal channel 565a, associated with frontside plate 670, and backside post-dispersal channel 565b, associated with backside plate 680. An example of common fork 710 is shown in the perspective view of FIG. 16A. As shown in FIG. 16B, frontside post-dispersal channel 565a may lead into frontside flow divider 620a which may then split the associated flow of ionically conductive medium at frontside T junction 625a, where the flow divides in opposing directions that meet at frontside outlet manifold 630a. The split flows may then traverse through a plurality of frontside flow lane outlets 635a, each associated with the electrodes and frontside flow lanes associated with frontside plate 670. Likewise, as shown in FIG. 16C, backside post-dispersal channel 565b may lead into backside flow divider 620b which may then split the associated flow of ionically conductive medium at backside T junction 625b, where the flow divides in opposing directions that meet at backside outlet manifold 630b. The split flows may then traverse through a plurality of backside flow lane outlets 635b, each associated with the electrodes and backside flow lanes associated with backside plate 670.

Figure 17:
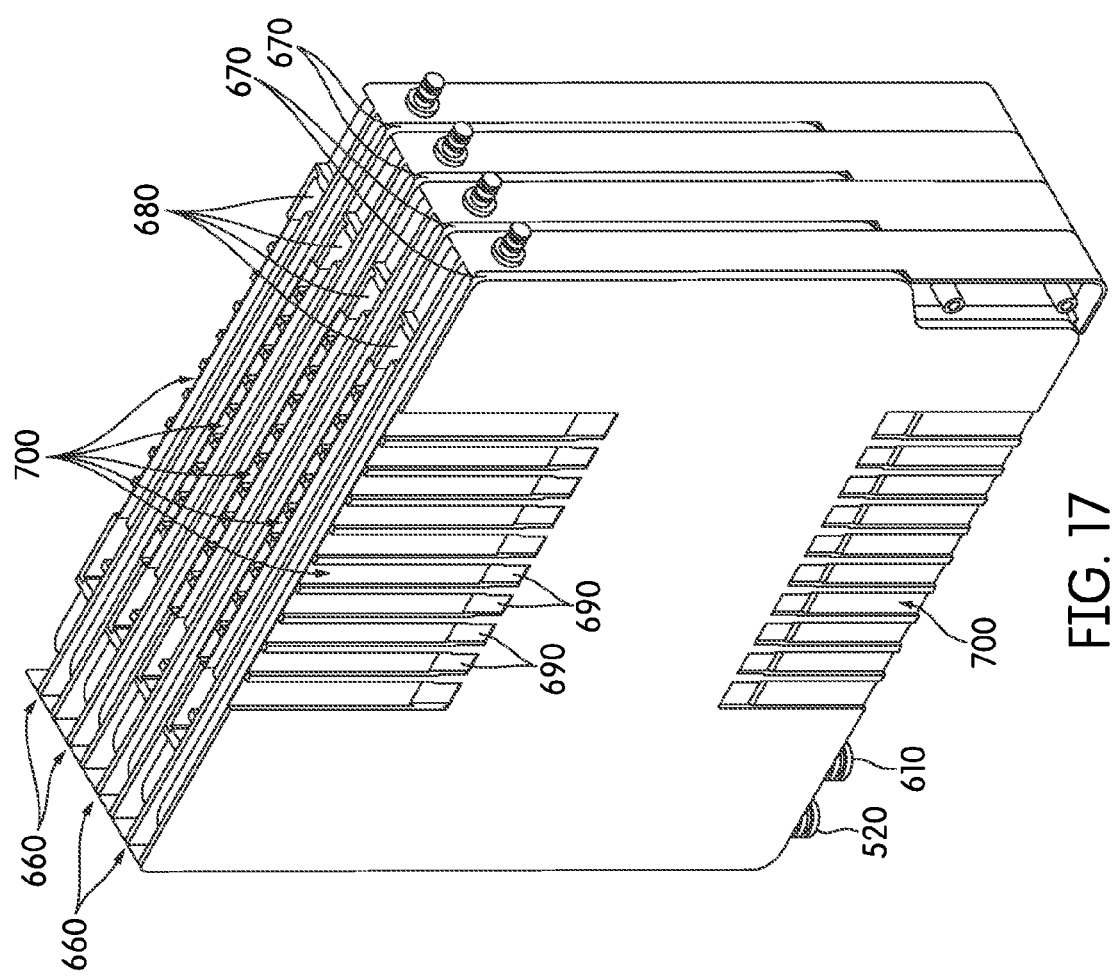
FIG. 17 illustrates an assembly of a plurality of the cell assemblies of FIG. 15, arranged such that air may reach the one or more air cathodes through the covering plates.

Turning to FIG. 17, it is seen that when assembled along side one another, each of the cell assemblies 660 may align with intermediate backside plates 680 in contact with intermediate frontside plates 670. In an embodiment, the air channels 700 leading to air apertures 690 on each of the intermediate frontside plates 670 and backside plates 680 are aligned, providing sufficient spacing for air to reach the frontside oxidant electrodes 414 and backside oxidant electrodes 414' via the joined air channels 700. Also as shown, the proximity of cell inlet 520 and cell outlet 610 may permit ease of access for a number of configurations for the flow of the ionically conductive medium. For example, in some embodiments, all of the cell inlets 520 may be coupled together by a manifold, and all of the cell outlets 610 may be coupled together by a manifold, such that the ionically conductive medium flows through the cell assemblies in parallel. In another embodiment, the intermediate cell outlets 610 may be coupled to the adjacent cell inlet 580, such that the ionically conductive medium flows through all cells in series. Also as shown, each of the air inlets 555 may be adjacent to one another when the cell assemblies 660 are aligned, which may ease the coupling of air inlet cabling for such embodiments. In various embodiments, an air inlet manifold may couple all air inlets 555 to a single cable that is coupled to air pump AP, while, in other embodiments, separate cables may all couple to one or more air pumps AP.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. As a non-limiting example, in some embodiments the configuration of the cell 105 may be similar to those disclosed in U.S. patent application Ser. No. 12/385,217 or 12/776,962, each of which are incorporated herein by reference. Thus, the present invention is intended to encompass all modifications, substitutions, alterations, and equivalents within the spirit and scope of the following appended claims.

What is claimed is:

1. A dispersing system for an ionically conductive medium comprising:
    a fluid inlet configured to receive the ionically conductive medium therethrough;
    a disperser configured to separate the ionically conductive medium into a plurality of discrete droplets;
    a chamber for receiving the plurality of discrete droplets, and collecting the plurality of discrete droplets to recombine into recombined ionically conductive medium;
    a fluid outlet configured to provide an outlet for the recombined ionically conductive medium;
    an air inlet communicated to the chamber; and
    an air pump configured to pump an amount of air into the chamber through the air inlet.

2. The dispersing system of claim 1, wherein the air pump is configured to pump the amount of air sufficient to provide a positive pressure on the recombined ionically conductive medium in the chamber.

3. The dispersing system of claim 1, wherein the disperser comprises one or more openings of approximately 0.1-5 mm in diameter.

4. The dispersing system of claim 1, wherein the fluid inlet is configured to receive the ionically conductive medium at a rate of approximately 0.1-2 liters per minute.

5. The dispersing system of claim 1, wherein the air pump is configured to pump between approximately 1-100 ml of air per minute through the air inlet per liter per minute of ionically conductive medium.

6. The dispersing system of claim 1, wherein the air pump is configured to pump dry air through the air inlet.

7. The dispersing system of claim 6, wherein the introduction of the dry air reduces a humidity level inside the chamber by at least 10%.

8. The dispersing system of claim 1, wherein the air pump is configured to pump ambient air through the air inlet.

9. The dispersing system of claim 1, integrated into a housing for an electrochemical cell comprising: (i) a fuel electrode comprising a metal fuel; and (ii) an oxidant electrode spaced from the fuel electrode; wherein the ionically conductive medium conducts ions between the fuel and oxidant electrodes to support electrochemical reactions at the fuel and oxidant electrodes.

10. The dispersing system of claim 1, wherein the chamber is closed to external air.

11. The dispersing system of claim 1, wherein the air inlet is configured to deliver air into the chamber above the level of recombined ionically conductive medium to pressurize a space above the recombined ionically conductive medium and inhibit growth of ionically conductive foam on the recombined ionically conductive medium.

12. An electrochemical cell system comprising:
    one or more electrochemical cells, each comprising:
        (i) a fuel electrode comprising a metal fuel; and
        (ii) an oxidant electrode spaced from the fuel electrode;
        an ionically conductive medium for conducting ions between the fuel and oxidant electrodes to support electrochemical reactions at the fuel and oxidant electrodes;
        a circulation path for flowing the ionically conductive medium through and among the cells;
        wherein the fuel electrode and the oxidant electrode are configured to, during discharge, oxidize the metal fuel at the fuel electrode and reduce an oxidant at the oxidant electrode to generate a discharge potential difference therebetween for application to a load; and
    one or more dispersing systems positioned along the circulation path and configured to disrupt an electrical shunt current in the ionically conductive medium between at least two of the electrochemical cells, each dispersing system comprising:
        (a) a disperser configured to separate the ionically conductive medium into a plurality of discrete droplets; and
        (b) a chamber for receiving the plurality of discrete droplets, and collecting the plurality of discrete droplets to recombine into recombined ionically conductive medium;
        wherein at least one of the one or more dispersing systems further comprises an air inlet configured to allow air into the chamber; and
    an air pump configured to pump an amount of air into the chamber through the air inlet.

13. The electrochemical cell system of claim 12, wherein each electrochemical cell further comprises a charging electrode selected from the group consisting of (a) the oxidant electrode, (b) a separate charging electrode spaced from the fuel and oxidant electrodes, and (c) a portion of the fuel electrode.

14. The electrochemical cell system of claim 13, wherein the reducible species of the metal fuel comprises ions of zinc, iron, aluminum, magnesium, or lithium, and wherein the metal fuel is zinc, iron, aluminum, magnesium, or lithium.

15. The electrochemical cell system of claim 12, wherein the fuel electrode and the charging electrode are configured to, during re-charge, reduce a reducible species of the metal fuel to electrodeposit the metal fuel on the fuel electrode and oxidize an oxidizable species of the oxidant by application of a re-charge potential difference therebetween from a power source.

16. The electrochemical cell system of claim 15, wherein the fuel electrode comprises a series of permeable electrode bodies arranged in spaced apart relation;

wherein the spaced apart relation of the permeable electrode bodies enables the re-charge potential difference to be applied between the charging electrode and at least one of the permeable electrode bodies, with the charging electrode functioning as the anode and the at least one permeable electrode body functioning as the cathode, such that the reducible fuel species are reduced and electrodeposited as the metal fuel in oxidizable form on the at least one permeable electrode body, whereby the electrodeposition causes growth of the metal fuel among the permeable electrode bodies such that the electrodeposited metal fuel establishes an electrical connection between the permeable electrode bodies.

17. The electrochemical cell system of claim 12, wherein the ionically conductive medium comprises an aqueous electrolyte solution.

18. The electrochemical cell system of claim 17, wherein the aqueous electrolyte solution comprises sulfuric acid, phosphoric acid, triflic acid, nitric acid, potassium hydroxide, sodium hydroxide, sodium chloride, potassium nitrate, or lithium chloride.

19. The electrochemical cell system of claim 12, wherein the disperser system is contained within a housing for at least one of the one or more electrochemical cells.

20. The electrochemical cell system of claim 12, wherein the air pump is configured to pump the amount of air sufficient to provide a positive pressure on the recombined ionically conductive medium in the chamber.

21. The electrochemical cell system of claim 12, wherein the chamber is closed to external air.

22. The electrochemical cell system of claim 12, wherein the air inlet is configured to deliver air into the chamber above the level of recombined ionically conductive medium to pressurize a space above the ionically conductive medium and inhibit growth of ionically conductive foam on the recombined ionically conductive medium.

23. A method for disrupting electrical current in an ionically conductive medium, the method comprising:
dispersing, in a chamber, the ionically conductive medium into a plurality of discrete droplets;
permitting, in the chamber, the plurality of discrete droplets to recombine into recombined ionically conductive medium;
adding an amount of air into the chamber to inhibit growth of ionically conductive foam on the recombined ionically conductive medium.

24. The method of claim 23, wherein dispersing the ionically conductive medium into a plurality of discrete droplets comprises passing the ionically conductive medium through a plurality of apertures.

25. The method of claim 23, wherein adding the amount of air into the chamber comprises pressurizing the chamber.

26. The method of claim 23, wherein adding the amount of air into the chamber comprises pumping the air into the chamber.

27. The method of claim 23, wherein the air is dry air configured to reduce a humidity level in the chamber.

28. The method of claim 23, wherein the amount of air includes ambient air.

29. The method of claim 23, wherein the chamber is closed to external air.

30. The method of claim 23, wherein the air is added to the chamber above the level of recombined ionically conductive medium to pressurize a space above the ionically conductive medium and inhibit growth of ionically conductive foam on the recombined ionically conductive medium.

31. A housing for one or more electrochemical cells, wherein each of the one or more electrochemical cells comprise: (i) a fuel electrode comprising a metal fuel; and (ii) an oxidant electrode spaced from the fuel electrode; and wherein an ionically conductive medium conducts ions between the fuel and oxidant electrodes to support electrochemical reactions at the fuel and oxidant electrodes; the housing comprising:
a circulation path for flowing the ionically conductive medium through the one or more electrochemical cells;
a first dispersion chamber positioned on the circulation path before the one or more electrochemical cells, and configured to disperse the ionically conductive medium before its flowing through the one or more electrochemical cells;
a second dispersion chamber positioned on the circulation path after the one or more electrochemical cells, and configured to disperse the ionically conductive medium after its flowing through the one or more electrochemical cells;
wherein each of the first dispersion chamber and the second dispersion chamber comprises:
(a) a disperser configured to separate the ionically conductive medium into a plurality of discrete droplets; and
(b) a lower portion for receiving the plurality of discrete droplets, and collecting the plurality of discrete droplets to recombine into recombined ionically conductive medium.

32. The housing of claim 31, further comprising an air inlet configured to selectively permit the addition of air into the lower portion of the first dispersion chamber.

33. The housing of claim 32, wherein the air inlet is configured to deliver air into the lower portion of the first dispersion chamber above the level of recombined ionically conductive medium to pressurize a space above the recombined ionically conductive medium and inhibit growth of ionically conductive foam on the recombined ionically conductive medium.

34. The housing of claim 31, further comprising one or more removable sidewalls which, when sealed to the housing, contain the ionically conductive medium to the circulation path.

35. The housing of claim 34, wherein the one or more removable sidewalls are configured to hold the oxidant electrode.

36. The housing of claim 31, wherein the first dispersion chamber and the second dispersion chamber are closed to external air.

* * * * *